(12) United States Patent
Stöcker et al.

(10) Patent No.: US 11,305,660 B2
(45) Date of Patent: Apr. 19, 2022

(54) SUPPLY MEDIUM EXCHANGE SYSTEM FOR MOBILE UNITS

(71) Applicants: Carsten Stöcker, Hilden (DE); Jürgen Waffner, Essen (DE)

(72) Inventors: Carsten Stöcker, Hilden (DE); Jürgen Waffner, Essen (DE)

(73) Assignee: innogy Innovation GmbH, Essen (DE)

(*) Notice: Subject to any disclaimer, the term of this patent is extended or adjusted under 35 U.S.C. 154(b) by 120 days.

(21) Appl. No.: 15/989,449

(22) Filed: May 25, 2018

(65) Prior Publication Data
US 2018/0272886 A1 Sep. 27, 2018

Related U.S. Application Data

(63) Continuation of application No. PCT/EP2015/078590, filed on Dec. 3, 2015.

(51) Int. Cl.
*G06F 15/16* (2006.01)
*B60L 53/30* (2019.01)
(Continued)

(52) U.S. Cl.
CPC ............. *B60L 53/305* (2019.02); *B60L 53/14* (2019.02); *B60L 53/65* (2019.02); *B60L 53/665* (2019.02);
(Continued)

(58) Field of Classification Search
CPC ............. H04L 67/104; H04L 29/08072; B60L 53/305; B60L 53/68; B60L 53/14;
(Continued)

(56) References Cited

U.S. PATENT DOCUMENTS 8,385,240 B2 * 2/2013 Krishnaswamy ..... H04W 40/10
370/311
8,600,830 B2 * 12/2013 Hoffberg ............ G06Q 30/0207
705/26.3
(Continued)

FOREIGN PATENT DOCUMENTS

CN 202712880 U 1/2013
CN 103326416 A 9/2013
(Continued)

OTHER PUBLICATIONS

Satoshi Nakamoto, "Bitcoin: A Peer-to-Peer Electronic Cash System", internet article, https://bitcoin.org/bitcoin.pdf, Oct. 31, 2008, 9 pages.
(Continued)

*Primary Examiner* — Khanh Q Dinh
(74) *Attorney, Agent, or Firm* — Reinhart Boerner Van Deuren P.C.

(57) ABSTRACT

Provided are embodiments of a supply medium exchange system. The system includes at least one supply medium exchange station having at least one supply medium exchange interface. It is configured to exchange a supply medium with at least one mobile unit including at least one supply medium storage and at least one first peer-to-peer module assigned to the mobile unit. It is also configured to communicate with at least one peer-to-peer application of at least one peer-to-peer network. The first peer-to-peer module is configured to cause a generation of a supply medium exchange release message for releasing of the exchange of the supply medium between the mobile unit and the supply medium exchange station by means of the peer-to-peer application.

16 Claims, 9 Drawing Sheets

(51) Int. Cl.
| | |
|---|---|
| *G07F 15/00* | (2006.01) |
| *B60L 53/14* | (2019.01) |
| *B60L 53/65* | (2019.01) |
| *B60L 53/66* | (2019.01) |
| *B60L 53/68* | (2019.01) |
| *G06F 21/64* | (2013.01) |
| *H04L 67/104* | (2022.01) |
| *G06Q 30/04* | (2012.01) |
| *G06Q 50/06* | (2012.01) |

(52) U.S. Cl.
CPC .............. *B60L 53/68* (2019.02); *G06F 21/64* (2013.01); *G07F 15/00* (2013.01); *G07F 15/001* (2013.01); *G07F 15/005* (2013.01); *H04L 67/104* (2013.01); *B60L 2270/38* (2013.01); *G06Q 30/04* (2013.01); *G06Q 50/06* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC ...... B60L 53/665; B60L 53/65; G07F 15/001; G07F 15/005; G07F 15/00
USPC .......................... 709/203, 220, 224, 227, 232
See application file for complete search history.

(56) References Cited

U.S. PATENT DOCUMENTS

| | | | | |
|---|---|---|---|---|
| 8,695,460 B2* | 4/2014 | Liau | ........................ | B25B 13/08 |
| | | | | 81/119 |
| 8,874,477 B2* | 10/2014 | Hoffberg | .............. | G06Q 20/065 |
| | | | | 705/37 |
| 9,112,578 B2* | 8/2015 | Wise | .................. | H04B 7/18513 |
| 9,112,700 B2* | 8/2015 | Link, II | ................ | H04L 9/3247 |
| 9,311,670 B2* | 4/2016 | Hoffberg | .............. | G06Q 20/401 |
| 9,380,177 B1* | 6/2016 | Rao | ........................ | H04L 45/306 |
| 9,489,495 B2* | 11/2016 | Li | ........................... | H04L 69/329 |
| 9,529,974 B2* | 12/2016 | Li | ........................... | G06Q 50/26 |
| 9,870,716 B1* | 1/2018 | Rao | ........................ | G09B 5/065 |
| 10,055,502 B2* | 8/2018 | Li | ........................... | G16H 50/80 |
| 10,194,275 B2* | 1/2019 | Kumar | .................... | H04W 4/20 |
| 2004/0203750 A1* | 10/2004 | Cowdrey | .............. | H04M 15/00 |
| | | | | 455/432.1 |
| 2007/0050248 A1* | 3/2007 | Huang | .................... | H04W 4/02 |
| | | | | 705/14.62 |
| 2010/0312022 A1* | 12/2010 | Van Milligen | .......... | C07C 29/12 |
| | | | | 568/852 |
| 2011/0051642 A1* | 3/2011 | Krishnaswamy | ..... | H04W 40/10 |
| | | | | 370/311 |
| 2011/0213656 A1 | 9/2011 | Turner | | |
| 2013/0334880 A1* | 12/2013 | Jerphagnon | ........... | H02J 7/0022 |
| | | | | 307/23 |
| 2015/0120523 A1 | 4/2015 | Lawrenson et al. | | |
| 2015/0227890 A1 | 8/2015 | Bednarek et al. | | |
| 2015/0281302 A1* | 10/2015 | Winston | .............. | H04L 67/1097 |
| | | | | 709/219 |
| 2020/0309552 A1* | 10/2020 | Palande | .............. | G01C 21/3617 |
| 2020/0401952 A1* | 12/2020 | Gardner | ................. | G06Q 10/02 |
| 2020/0402150 A1* | 12/2020 | Gardner | ............. | G06Q 30/0645 |

FOREIGN PATENT DOCUMENTS

| | | |
|---|---|---|
| CN | 104331797 A | 2/2015 |
| CN | 104519771 A | 4/2015 |
| EP | 2495844 A1 | 9/2012 |
| EP | 2 562 729 A2 | 2/2013 |
| EP | 2861451 A1 | 4/2015 |
| WO | WO 2012/091435 A2 | 7/2012 |

OTHER PUBLICATIONS

Jacob Stenum et al., "The Use of Block Chain Technology in Different Application Domains", internet article, http://www.lollike.org/bachelor.pdf, May 20, 2015, 110 pages.

Dr. Gavin Wood, "Ethereum: A Secure Decentralised Generalised Transaction Ledger EIP-150 Revision", internet article, http://gavwood.com/paper.pdf, Jun. 4, 2014, 32 pages.

Li et al., "Management and Application of Network Systems", *Textbook for IT Technologies-Computer Network Category*, Beijing University of Aeronautics and Astronautics Press, Aug. 2009, pp. 5-9.

\* cited by examiner

SUPPLY MEDIUM EXCHANGE SYSTEM FOR MOBILE UNITS

CROSS-REFERENCE TO RELATED PATENT APPLICATION

This patent application is a continuation of PCT/EP2015/078590, filed Dec. 3, 2015, the entire teachings and disclosure of which are incorporated herein by reference thereto.

FIELD OF THE INVENTION

The invention relates to a supply medium exchange system comprising at least one supply medium exchange station comprising at least one supply medium exchange interface configured to exchange a supply medium with at least one mobile unit comprising at least one supply medium storage. The invention relates also to a peer-to-peer application, a supply medium exchange station, a first peer-to-peer module, a supply medium transmission connection and a method.

BACKGROUND OF THE INVENTION

Supply medium exchange systems for exchanging a supply medium between a (stationary or non-stationary) supply medium exchange station and a mobile unit comprising a supply medium storage are known from prior art. Examples of supply medium exchange systems which are not exhaustive are electrical supply systems, gas supply systems and fuel supply systems.

All supply medium exchange systems are characterized in the present application in that at least one supply medium is transferred and exchanged, respectively, between a stationary entity and station, respectively, and a mobile entity and unit, respectively. It shall be understood that a supply medium can flow in both directions. Examples of mobile units are all vehicles, such as cars, trucks, ships, railway vehicles, planes, bicycles, drones, mobile machines, etc. Common to all mobile units of the present invention are that each mobile unit comprises at least one supply medium storage configured to store a supply medium. Examples of supply medium storages are electrical batteries, fuel cells, gas tanks, biomass storage and fuel tanks e.g. for liquid or solid fuels. The supply medium can in particular be consumed by the mobile unit in order to operate at least one function of the mobile unit. For instance, the supply medium can be consumed by a motor configured to move or drive the mobile unit.

A supply medium exchange station is configured to exchange a supply medium with such a mobile unit. By way of example, a supply medium exchange station is an electrical charging station, a fuel dispensing station and/or a gas dispensing station. A supply medium exchange station comprises or is at least connectable with a supply medium device. This may be a supply medium network, such as an electrical grid or a gas supply network, or a supply medium storage, such as a fuel tank or the like.

Common to all prior art supply medium exchange systems are that, in addition, a central subsystem, a central process and/or a central organization or instance is provided, in order to manage the supply medium exchange process. In particular, the release of an exchange of supply medium as well as the purchase and sale of a supply medium are centrally controlled by a central instance/server. Trade takes place exclusively via this or possibly a further central instance.

Technically speaking, a corresponding supply medium exchange system is realized according to prior art by a client-server structure. The central organization or instance is created by one or a plurality of central servers. A server of this kind or a platform can be distributed and located on different computing devices, for example. This means that a virtual server can be realized by a cloud. For example, a centrally arranged database can be provided.

In particular, a central instance/server is configured to order or trade the supply medium, release a supply medium exchange process, carry out the billing process, oversee payment and/or manage the portfolio. In particular, the central server is used as a confidential instance for the at least two entities involved in a supply medium exchange process, i.e. the supply medium exchange station and the mobile unit. The central instance, such as a server or a platform, defines the rules. Because e.g. supply medium exchange agreements and the release of a supply medium exchange process are controlled by the central server, it is ensured that the processes are carried out correctly for all entities involved. In other words, a central instance prevents tampering by one of the participating entities and/or by third parties.

Based on the example of an electrical supply medium exchange system 100, a typical prior art supply medium exchange system 100 is described by means of FIG. 1. More particularly, FIG. 1 shows an electrical charging system 100 for charging a mobile unit 104.

As can be seen from FIG. 1 the mobile unit 104 is a vehicle 104, such as a car 104, having a battery 106 to be charged. The vehicle comprises a charging controller 150 for controlling charging of the battery 106. In order to charge the vehicle 104 and battery 106, respectively, a supply medium transmission connection 108 in form of a charging cable 108 may provide an electrical connection between a supply medium exchange interface in form of a charging interface 110 of the vehicle 104 and a further supply medium exchange interface in form of a further charging interface 114 of a supply medium exchange station 102, such as a charging station 102.

The charging station 102 is connected via a connector 116 to a supply medium device 118. In the present example the supply medium device 118 is an electrical grid 118. In order to transmit supply medium in form of electrical power to the vehicle 104 a supply medium exchange controller 120, e.g. a charging controller 120, may create an electrical connection between the connector 116 and the charging interface 114 e.g. by closing a switch.

During charging the vehicle 104, a meter 122 measures the exchanged amount of electrical power and transmits the measured amount after the charging process to a communication module 124. The communication module 124 is configured to transmit the measured amount of supply medium to a central server 126 via a communication network 128. For instance, the communication network 128 may be a wireless communication network 128.

As described above, based on the provided amount of exchanged power and e.g. based on a general transaction agreement between the mobile unit 104 (or user of the mobile unit 104) and the central instance 126, the central server 126 is configured to bill the charging process with the mobile unit 104. E.g. a credit card assigned to the mobile unit 104 (or user of the mobile unit 104) can be charged. These confidential data is generally stored in a database 129 of the sever 126.

Prior to releasing the supply medium exchange process, such as the charging process, an authentication process is usually conducted between the charging station 102 and the mobile unit 104 (or user of the mobile unit 104). In the present example, the charging station 102 comprises a reading module 130 e.g. for reading out an identification assigned to the mobile unit 104 from a card 132 of the user of the mobile unit 104.

The reading module 130 may transmit said identification to the communication module 124 which transmits the identification to the server 126. The server 126 checks whether the mobile unit 104 corresponding to the received identification is authorized to use the charging station 102 and in particular to receive electrical power from the charging station 102. The server 126 compares the received identification with registered identifications of mobile units stored in the database 129. Only in the case of a received valid identification the server 126 sends a supply medium exchange release message to the communication module 124. Then, the charging or load controller 120 releases the charging process upon a respective notification of the communication module 124.

In other examples, in order to initiate the authorization process the identification of the mobile unit can be transmitted from a communication module 112 of the mobile unit 104 to the charging station 102 and then to the server 126 or directly from the mobile unit 104 to the server 126 via a communication network 134.

The disadvantage of server-client structures of this kind, particularly the server (or platform), apart from the high transaction costs, is that the central instance or central server manages the confidential customer data. A persistent problem affecting the central instance is that of protecting the customer data stored on one server or a plurality of servers from access by unauthorized third parties. In particular, a high degree of security expenditure is required in order to prevent customer data (e.g. registered identifications), billing data, etc. from being tampered. This in turn leads to higher transaction costs.

Therefore, the object of the present invention is to provide a supply medium exchange system which simplifies a supply medium exchange process and, at the same time, offers a high level of security.

BRIEF SUMMARY OF THE INVENTION

The object is solved according to a first aspect of the invention by a supply medium exchange system described herein. The supply medium exchange system comprises at least one supply medium exchange station comprising at least one supply medium exchange interface configured to exchange a supply medium with at least one mobile unit comprising at least one supply medium storage. The supply medium exchange system comprises at least one first peer-to-peer module assigned to the mobile unit and configured to communicate with at least one peer-to-peer application of at least one peer-to-peer network. The first peer-to-peer module is configured to cause a generation of a supply medium exchange release message for releasing of the exchange of the supply medium between the mobile unit and the supply medium exchange station by means of the peer-to-peer application.

In contrast to the prior art, a supply medium exchange process can be easily performed by releasing the supply medium exchange process by means of a peer-to-peer application of a peer-to-peer network and without a central instance. By the fact that instead of a central server or a platform, a peer-to-peer network (also called a framework) undertakes the tamper-proof generation of a supply medium exchange release message by means of a peer-to-peer application the supply medium exchange process, in particular, the authorization process can be simplified. In the case of a peer-to-peer network, high security standards are achieved in that all computers (peer nodes) in the network, at least a part of the peer computers in the network, monitor(s) at least the accuracy of the generation of a supply medium exchange release message. The transaction costs can be significantly reduced. No central, superior platform, server, cloud, etc. is required.

The supply medium exchange system of the present invention enables the exchange of a supply medium between at least one stationary entity in form of a supply medium exchange station and a mobile entity or unit. The mobile unit is characterized in that it comprises at least one supply medium storage configured to store a particular supply medium.

Examples of supply medium exchange systems which are not exhaustive are electrical supply systems, gas supply systems, biomass supply systems, (liquid or solid) fuel supply systems. Furthermore, examples of mobile units are all vehicles, such as cars, trucks, ships, railway vehicles, planes, bicycles, drones, mobile machines, etc. In one embodiment the vehicle may be an autonomous operated vehicle.

The supply medium exchange station comprises at least one supply medium exchange interface. Also the mobile unit may comprise at least one supply medium exchange interface. The interfaces can be directly connected to each other (without a further means) and/or the interfaces can be connected by a supply medium transmission connection comprising ports corresponding to the respective interfaces.

The system comprises at least one first peer-to-peer module. The first peer-to-peer module is (uniquely) assigned to the mobile unit. This means that the first peer-to-peer module can at least communicate and/or act on behalf of the mobile unit. Furthermore, since the mobile unit can be assigned to one or more user, the first peer-to-peer module can be (indirectly) assigned to the at least one user. For example, the peer-to-peer module can be integrated in the mobile unit or it can be formed by separate processing device, such as mobile communication device, owned by a user of the mobile unit, or it can run on a remote processing device (e.g. in a data centre) In case of a remote processing device the mobile unit may have a secure communication channel to the processing device of the data centre and the processing device itself may have a connection to the peer-to-peer network. In an alternative embodiment the remote processing device may be a gateway to the peer-to-peer network. This means that the mobile unit has a secure access to the peer-to-peer network via a communication channel with the gateway.

In comparison to a client-server network in which a server provides a service and a client uses the service, these roles are cancelled in a peer-to-peer network. Each participant of the peer-to-peer network can use a service and the like and offer such a service. In particular, a peer-to-peer network is self-determined and/or self-organized (without any higher-level units). In the present case preferably each computer of the peer-to-peer network comprises a peer-to-peer application. In particular, the first peer-to-peer module is configured to send messages to the peer-to-peer application and/or read data stored in the peer-to-peer application. The first peer-to-peer module may be a peer of the peer-to-peer network.

The first peer-to-peer module is configured to communicate with the peer-to-peer application of the first peer-to-peer network. By communicating with the peer-to-peer application the first peer-to-peer module causes a generation of a supply medium exchange release message for releasing of the exchange of the supply medium between the mobile unit and the supply medium exchange station by means of the peer-to-peer application. In other words, the exchange of a supply medium requires that a peer-to-peer module assigned to a mobile unit is configured to communicate with the peer-to-peer application, in particular, to cause or trigger the generation of a supply medium exchange release message. Furthermore, the peer-to-peer application may generate a supply medium exchange release message e.g. after a positive verification check of the first peer-to-peer module performed by means of the peer-to-peer application and by at least a part of the nodes of the peer-to-peer network.

The list of all (anonymised) participants or entities of the peer-to-peer network can preferably be made known to each participant, so in particular to each entity of the supply medium exchange system, as a peer-to-peer identification, e.g. in the form of a communications address.

A peer-to-peer module can be at least partially formed by a software module and/or at least partially formed by hardware module.

According to a first embodiment of the supply medium exchange system of the present invention, the supply medium exchange system may comprise at least one second peer-to-peer module assigned to the supply medium exchange station. The second peer-to-peer module may be configured to receive the supply medium exchange release message from the peer-to-peer application. The second peer-to-peer module may be configured to cause the release of the exchange of the supply medium between the mobile unit and the supply medium exchange station based on the received supply medium exchange release message. By providing a second peer-to-peer module assigned to the supply medium exchange station a supply medium exchange process can be released in a particularly easy and secure manner. The at least one second peer-to-peer module may be (uniquely) assigned to the supply medium exchange station. This means that the second peer-to-peer module can at least communicate and/or act on behalf of the supply medium exchange station. Furthermore, since the supply medium exchange station can be assigned to one or more charging interfaces, the peer-to-peer module can be (indirectly) assigned to the at least one owner of the supply medium exchange station. For example, the second peer-to-peer module can be integrated in the supply medium exchange station or it can be formed by separate processing device, such as mobile communication device, .g. owned by a user of a mobile unit or it can run on a remote processing device (e.g. in a data centre) In case of a remote processing device the supply medium exchange station may have a secure communication channel to the processing device of the data centre. The processing device itself may have a connection to the peer-to-peer network. In an alternative and preferred embodiment the remote processing device may be a gateway to the peer-to-peer network. This means that the mobile unit has a secure access to the peer-to-peer network via a communication channel with the gateway.

The second peer-to-peer module is at least configured to read data stored or generated in/by the peer-to-peer application. In particular, the second peer-to-peer module can read out and receive, respectively, a supply medium exchange release message from the peer-to-peer application. Then the second peer-to-peer module can cause the release of a supply medium to or from the mobile unit e.g. by transmitting a release signal to a supply medium exchange controller of the supply medium exchange station.

There may be several possibilities for the first peer-to-peer module to trigger the generation of a supply medium exchange release message, and thus, the release of the exchange of the supply medium with the mobile unit to which the first peer-to-peer module is assigned. According to a preferred embodiment, in order to cause the generation of a supply medium exchange release message the first peer-to-peer module may be configured to transmit a supply medium exchange request message to the peer-to-peer application. The supply medium exchange request message may comprise at least a peer-to-peer identification assigned to the mobile unit and/or a peer-to-peer identification assigned to the supply medium exchange station. The peer-to-peer identification may be uniquely assigned to the mobile unit. In other words, at least within the peer-to-peer network the mobile unit can be unambiguously identified by said identification. Preferably, each mobile unit and/or each supply medium exchange station has a unique peer-to-peer identification which allows unambiguously identifying each of the entities of a peer-to-peer network.

Preferably, before generating a supply medium exchange release message, by means of the peer-to-peer application and at least by some of the nodes of the peer-to-peer network, the at least one received identification of a request message can be checked. Preferably, all identifications of all entities of the peer-to-peer network are stored and registered, respectively, in the peer-to-peer application and/or in a database or decentral file system (such as IPFS) controlled by the peer-to-peer application, such as by a smart contract of the peer-to-peer application. Then, the at least one identification of a request message can be compared with the registered identifications. Only in the case the at least one, preferably the identification of the mobile unit and the identification supply medium exchange station are valid identifications, i.e. correspond to registered identifications, the supply medium exchange release message can be generated by the peer-to-peer application. A decentral and trustful authorization process can be provided by means of the peer-to-peer application without the need of a central server or the like.

Preferably, each entity can be registered in the peer-to-peer application as e.g. a so called smart asset. According to an embodiment of the system according to the present invention, the first peer-to-peer module may be configured to cause a registration of the mobile unit in the peer-to-peer application by transmitting a registering message comprising at least an identification assigned to the mobile unit. The identification might be already a peer-to-peer application or another identification suitable to uniquely identify the mobile unit, such as serial number of e.g. the mobile unit, the user's name, etc. In the latter case, the peer-to-peer application may be configured to generate a unique peer-to-peer identification for the mobile unit. The second peer-to-peer module may be additionally or alternatively configured to cause a registration of the supply medium exchange station in the peer-to-peer application by transmitting a registering message comprising at least an identification assigned to the supply medium exchange station. In particular, the peer-to-peer application may register the respective entities by storing at least the peer-to-peer identification in the peer-to-peer application or a database controlled by the peer-to-peer application.

Prior to the registration of a mobile unit and/or supply medium exchange station, at least part of the peers of the peer-to-peer network may check whether the registering requirements predefined by the peer-to-peer network are met by the mobile unit and/or the supply medium exchange station. In order to perform the check, preferably, further data may be included in the registering message. In particular, the peers of the peer-to-peer network may provide registering rules or registering requirements which must be fulfilled by an entity to be regarded as a trustful entity. By way of example, each entity to be registered must comprise an account and/or a particular amount of a cryptocurrency. Other rules/requirements may be individually defined by the peers of a peer-to-peer network. E.g. it may be necessary that a new entity must be recommended by an entity which is already a participant of the peer-to-peer network. In addition, it may be necessary that this participant must have a reputation factor which increases a predefined minimum reputation factor.

Furthermore, it may be advantageous if in the registering process also technical details of the mobile unit and/or the supply medium exchange system can be stored together with the respective peer-to-peer identification in the peer-to-peer application or the database accessible by the peer-to-peer application. Example of technical details may be a maximum supply medium capacity of the storage of the mobile unit, the maximum and/or minimum supply medium delivery rate and/or receiving rate, such as a maximum/minimum charging current, maximum/minimum flow rate of a fluid, etc. Since the peer-to-peer application provides respective technical details, a mobile unit can select a supply medium exchange station which is particular suitable for an exchange of supply medium with the mobile unit.

The first peer-to-peer module can detect a peer-to-peer identification of a supply medium exchange station, which should be used by the mobile unit of the first peer-to-peer module for an exchange process, in different ways. In a preferred embodiment, the mobile unit and the supply medium exchange station may be configured to establish a communication connection between the mobile unit and the supply medium exchange station for exchanging information data. At least one of the first peer-to-peer module and the second peer-to-peer module may be configured to transmit the exchanged information data to the peer-to-peer application. For instance, the peer-to-peer identifications can be exchanged and e.g. the first peer-to-peer module may transmit a supply medium exchange request message comprising the peer-to-peer identifications of the mobile unit and the supply medium exchange station. For instance, a wired connection e.g. by means of a charging cable or the like or a wireless communication connection can be established between the mobile unit and the supply medium exchange station. At least part of the information exchanged can be forwarded to at least one of the first peer-to-peer module and the second peer-to-peer module. This communication connection can also be used to exchange technical information required for the supply medium exchange process.

In the supply medium exchange release message, details of the supply medium exchange process to be conducted between the mobile unit and the supply medium exchange station can be defined by means of the peer-to-peer application. For instance, the involved entities can agree about the time period of the exchange process, the amount of a supply medium to be exchanged and/or a transaction criterion, such as an amount of cryptocurrency. In this case, the supply medium exchange release message may be generated based on a supply medium exchange transaction agreement. In a specific case, the supply medium exchange release message may be a supply medium exchange transaction agreement. In another specific case, further details may be exchanged by means of the peer-to-peer application or the communication may be at least triggered or controlled by the peer-to-peer application. Such details can be a "tariff table" including time-dependent charging instructions or price information. This information can be used by the controller of the mobile unit to control the charging process based on economic parameters.

In order to ensure that the supply medium exchange process is carried out in accordance with the predefined details of an exchange process, at least one of the supply medium exchange station and the mobile unit may comprise at least one meter configured to measure the exchanged amount of the supply medium between the supply medium exchange station and the mobile unit preferably during the supply medium exchange process. At least one of the first peer-to-peer module and the second peer-to-peer module may be configured to transmit the measured amount of the supply medium to the peer-to-peer application. In the case that both the mobile unit and the supply medium exchange station comprise a meter the first peer-to-peer module can transmit the meter data measured by the meter of the mobile unit to the peer-to-peer application and the second peer-to-peer module can transmit the meter data measured by the meter of the supply medium exchange station to the peer-to-peer application. Then the correctness of the meter data and/or the fulfilment of a previously generated supply medium exchange transaction agreement can be checked by at least part of the peers of the peer-to-peer network by means of the peer-to-peer application in a truthful manner.

A first peer-to-peer module assigned to a mobile unit may be integrated within the mobile unit. Also the second mobile unit assigned to the supply medium exchange station may be a part of the supply medium exchange station. According to a preferred embodiment, the supply medium exchange system may comprise at least one mobile communication unit (e.g. assigned to a user of a mobile unit) comprising at least one of the first peer-to-peer module and second peer-to-peer module. The mobile communication unit may comprise at least one first nearfield communication module configured to communicate with at least one second nearfield communication module of at least one of the supply medium exchange station and the mobile unit. The mobile communication unit can be a smartphone, laptop, smart watch, etc. The mobile communication unit may comprise a first peer-to-peer module and/or a second peer-to-peer module e.g. in form of a software module which can be performed by the processor of the mobile communication unit. In this case, a peer-to-peer module may be a downloadable application. A peer-to-peer module may be (uniquely) assigned to the mobile unit or supply medium exchange station e.g. by a further registering process with the mobile unit or supply medium exchange station (e.g. by means of the peer-to-peer application).

The mobile communication unit may comprise a nearfield communication module for setting up a nearfield communication connection with the mobile unit and/or supply medium exchange station. The mobile unit and/or supply medium exchange station may comprise a respective nearfield communication module. Then, by means of the mobile communication unit a communication connection with the peer-to-peer application via a wide area communication can be established. By means of this nearfield communication connection it is possible to communicate with the peer-to-peer application by means of a mobile communications equipment used by the users of the supply medium exchange station and/or mobile unit.

In particular, it is possible by means of near field communication (NFC), Bluetooth, ZigBee, WLAN, RFID, WiFi, a meshed wireless network or the like to build up a nearfield communication.

The mobile communication unit generally has means to establish a long-distance connection. This can be either a wireless connection to an Internet access point or a wireless connection, especially a cellular mobile radio network, such as GSM, GPRS, UMTS, LTE, EDGE, CDMA, W-CDMA or the like. Users of the charging stations have usually a so-called "flat rate" data rates, enabling a cost-neutral communication between the mobile communication unit and a peer-to-peer application of a peer-to-peer network connected to the Internet.

According to a further embodiment of the supply medium exchange system according to the present invention, at least one of the first peer-to-peer module and the second peer-to-peer module can be configured to cause a generation of a transaction criterion transaction based on a transaction criterion specified in a supply medium exchange transaction agreement and preferably the measured quantity of exchanged supply medium. Preferably, depending on a positive previously described review of the measured amount of supply medium of a delivered/received supply medium quantity, a peer-to-peer module may be arranged to cause a generation of a transaction criterion transaction. For example, a certain amount of a crypto currency and/or the above mentioned "tariff table" can be established as a transaction criterion. In the case the delivery was carried out according to the supply medium exchange transaction agreement, by means of peer-to-peer network, in particular by the peer-to-peer application, the specified amount can be transferred in a transaction criterion transaction. Similarly as described above, also in this transaction unique keys of the peer-to-peer modules can be used for verification. The keys and in particular the actual possession of the amount by a peer-to-peer module or associated mobile unit or supply medium exchange station can be verified by the peer-to-peer network, such as described above. A secure payment by means of a peer-to-peer network without central authority can be provided. Transaction costs can be further reduced.

According to a further embodiment, the first peer-to-peer application can be a decentralized register. A decentralized register can be readable at least by a part of the participants of the peer-to-peer network. In particular, every computer node including e.g. the first peer-to-peer module and/or the second peer-to-peer module can comprise the peer-to-peer application. The decentralized register may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. In a simple way information can be made available to preferably all participants. This allows to carry out a review of the information stored in the decentral register. Particularly preferably, each computer in the peer-to-peer network can be configured to review new information, in particular based on older information stored in the peer-to-peer application.

Moreover, preferably each computer can in each case comprise the complete data content, but include at least a portion of the data contents of the peer-to-peer application, in particular of the decentral register. For example, it may be provided that after a positive verification of written information in the peer-to-peer application this information is saved by all computers, at least by a part of the computers. The tamper resistance of the data stored in the peer-to-peer application can thereby be further improved.

In order to store new information in a tamper-proof way, the peer-to-peer application can comprise encryption means and/or signature means and/or verification means, wherein at least one of the encryption means and/or signature means and/or verification means is configured to store at least supply medium exchange release message. In particular, it can be provided that by the hash function a link is established with at least one previously stored information in the decentral register. Further data, such as request messages, ordinary, contextual and/or transaction data of an entity, such as a mobile unit or supply medium exchange station, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other. The block chain technology or "decentral ledger technology" is already used in the payment by means of a crypto currency, such as Bitcoin. It has been recognized that by a particular configuration of a block chain, at least the correctness of a supply medium exchange release message can be checked without the need of a central server. In addition, the block chain can be used to generate a supply medium exchange release message caused by at least the first peer-to-peer module in a tamper-proof manner. The block chain according to the present embodiment is particularly a decentralized, peer-to-peer-based register in which all data related to an exchange of a supply medium between a mobile unit and a supply medium exchange station and other messages sent be peer-to-peer modules can be logged. A block chain is particularly suitable as a technical means to replace a central entity/server in a simple and secure manner.

In alternative embodiments of the peer-to-peer application the block chain can be a permissionless or permissioned block chain. In a specific case the block chain can be public, consortium or private block chain.

In a further embodiment the peer-to-peer application can be formed by multiple block chains which are connected via mechanisms such as side chains.

Data of the peer-to-peer application can be stored on the "decentral ledger technology" and/or the de-central ledger steers (encrypted) data storage accessible via the internet and preferably in de-central data storage entity such as Interplanetary File System (IPFS).

In a further embodiment, the at least one peer-to-peer network can be formed by a plurality of computer nodes and a peer-to-peer module, such as the first and/or second peer-to-peer module, is only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can generate a secure connection (e.g. tunnel) to a peer-to-peer gateway in order to communicate with the peer-to-peer network. This allows reducing the required processing power of the peer-to-peer module.

In one implementation of the peer-to-peer network there can be only one validating peer or full node, e.g. only one node can be configured to perform a validation process, and one or more observing nodes. An observing node can validate transactions to establish a trust level but do not validate all transactions which is done by the validating peer.

In an alternative embodiment, the peer-to-peer module is one of the computer nodes. In this case, the peer-to-peer module comprises at least a part of the peer-to-peer application. For instance, the peer-to-peer module might be a so called light node. In particular, the peer-to-peer module can comprise preferably the total data content of the peer-to-peer application.

According to a preferred embodiment, the peer-to-peer application may comprise a reputation store and/or may be configured to access a reputation store. The reputation store comprises at least the peer-to-peer identification of at least one of a registered mobile unit and/or supply medium charging station together with a reputation factor assigned to the respective mobile unit and/or supply medium charging station. The peer-to-peer application may be configured to update the at least one reputation factor based on a validation result, preferably a plurality of validation results. For instance, meter data of an exchange process can be analyzed by the peer-to-peer network and used for updating reputation factors. For instance, if the meter data are correct, a reputation factor can be increased while a reputation factor can be reduced if the meter data do not correspond to the actual exchanged amount of supply medium. In addition, further information, such as feedback data about the satisfaction of the entities involved in a supply medium exchange process, can be provided by at least one peer-to-peer module to the peer-to-peer application. Also this data can be used for adapting reputation factors.

The reputation system can be provided by the peer-to-peer application to preferably all participants of the peer-to-peer network. A mobile unit and/or a supply medium exchange station can select a corresponding supply medium exchange station or mobile unit based on the (current) reputation factor assigned to the supply medium exchange station or mobile unit.

Furthermore, in particular in the case of an electrical supply medium exchange system, the peer-to-peer application may instruct mobile units to go to another supply medium exchange station in order to avoid an instability of the power grid and/or to increase the stability of the power grid. For stabilizing a power grid, it can also be possible that the peer-to-peer application informs mobile unit about an excess of power or a lack of power in the grid. Then at least one mobile unit can receive power from the charging station or feed in power via the charging station in order to support the stabilizing of the power grid, such as a micro power grid.

A further aspect of the present invention is a peer-to-peer application. The peer-to-peer application of a peer-to-peer network is adapted for a supply medium exchange system, in particular a previously described supply medium exchange. The peer-to-peer application comprises means for receiving a supply medium exchange request message from a first peer-to-peer module assigned to a mobile unit. The peer-to-peer application comprises means for generating a supply medium exchange release message based on the received supply medium exchange request message. The means may be respective code elements of one or more smart contracts of the peer-to-peer application. In contrast to the prior art, by using the peer-to-peer application of a peer-to-peer network, a central server or the like can be omitted.

A further aspect of the present invention is a supply medium exchange station. The supply medium exchange station comprises at least one supply medium exchange interface configured to exchange supply medium with at least one mobile unit comprising at least one supply medium storage via a further supply medium exchange interface of the mobile unit. The supply medium exchange station comprises at least one second peer-to-peer module assigned to the supply medium exchange station. The second peer-to-peer module is configured to receive a supply medium exchange release message from the peer-to-peer application. The second peer-to-peer module is configured to cause the release of the exchange of the supply medium between the mobile unit and the supply medium exchange station based on the received supply medium exchange release message.

According to an embodiment of the supply medium exchange station the supply medium exchange station may comprise at least one supply medium connector to at least a supply medium device configured to provide supply medium to the supply medium exchange station and/or to receive supply medium from the supply medium exchange station. For instance, the supply medium device may be a supply medium storage or a supply medium grid.

A yet further aspect of the present invention is a first peer-to-peer module assigned to a mobile unit. The first peer-to-peer module is configured to communicate with a peer-to-peer application of a peer-to-peer network. The first peer-to-peer module is configured to cause a generation of a supply medium exchange release message for releasing of the exchange of the supply medium between the mobile unit and a supply medium exchange station by means of the peer-to-peer application. The peer-to-peer module may be at least partly formed by a software module and/or at least partly formed by a hardware module. The mobile unit may be a part of another processing device.

A further aspect of the present invention is a supply medium transmission connection. The supply medium transmission connection comprises a first supply medium port corresponding to a supply medium exchange interface of a mobile unit and a further supply medium port corresponding to a supply medium exchange interface of a supply medium exchange station. The first supply medium port and the further supply medium port are connected by a supply medium channel. The supply medium transmission connection comprises at least one first peer-to-peer module assigned to the mobile unit and configured to communicate with at least one peer-to-peer application of at least one peer-to-peer network. The first peer-to-peer module is configured to cause a generation of a supply medium exchange release message for releasing of the exchange of the supply medium between the mobile unit and the supply medium exchange station by means of the peer-to-peer application. The supply medium transmission connection may be a separate device. The supply medium transmission connection may be a charging cable. According to a preferred embodiment, the supply medium transmission connection may comprise a meter. For instance, the meter and the first peer-to-peer module may be implemented in a common casing.

A yet further aspect of the present invention is a method. The method comprises causing, by a first peer-to-peer module, a generation of a supply medium exchange release message for releasing of the exchange of the supply medium between a mobile unit and a supply medium exchange station by means of the peer-to-peer application.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit the measured quantity parameter to the peer-to-peer application via the API. The decentral application is at least configured to process and transmit the meter data.

Preferably, the data can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

According to the present invention, a man-in-the-middle is not necessary. Fully automated processes from authentication to charging and billing can be provided.

The features of the methods, systems, modules, devices, units, supply medium transmission connections, and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION OF THE INVENTION

Figure 1:
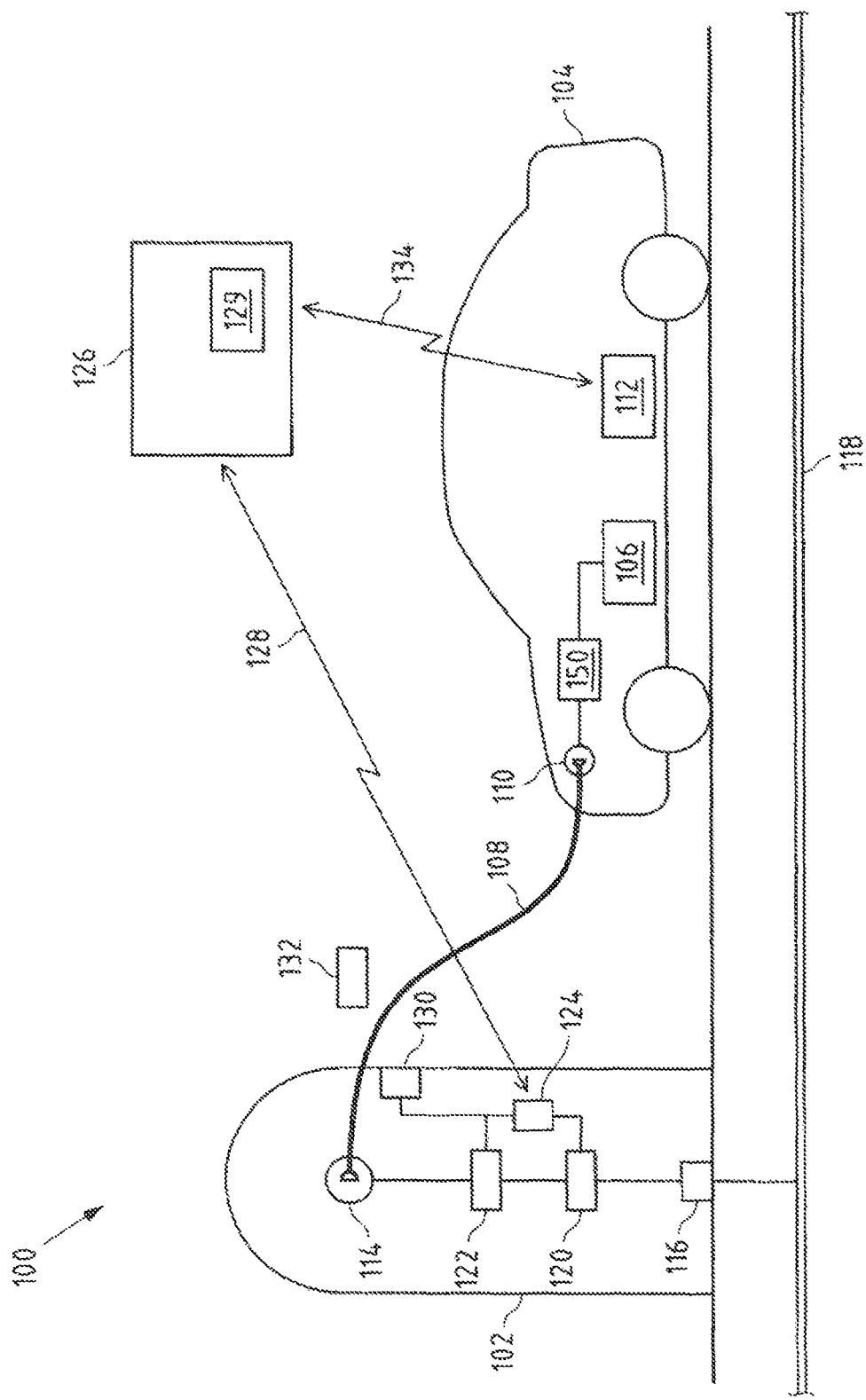
FIG. 1 shows a schematic view of an embodiment of a supply medium exchange system according to prior art.

Like reference numerals in different figures indicate like elements.

Figure 2:
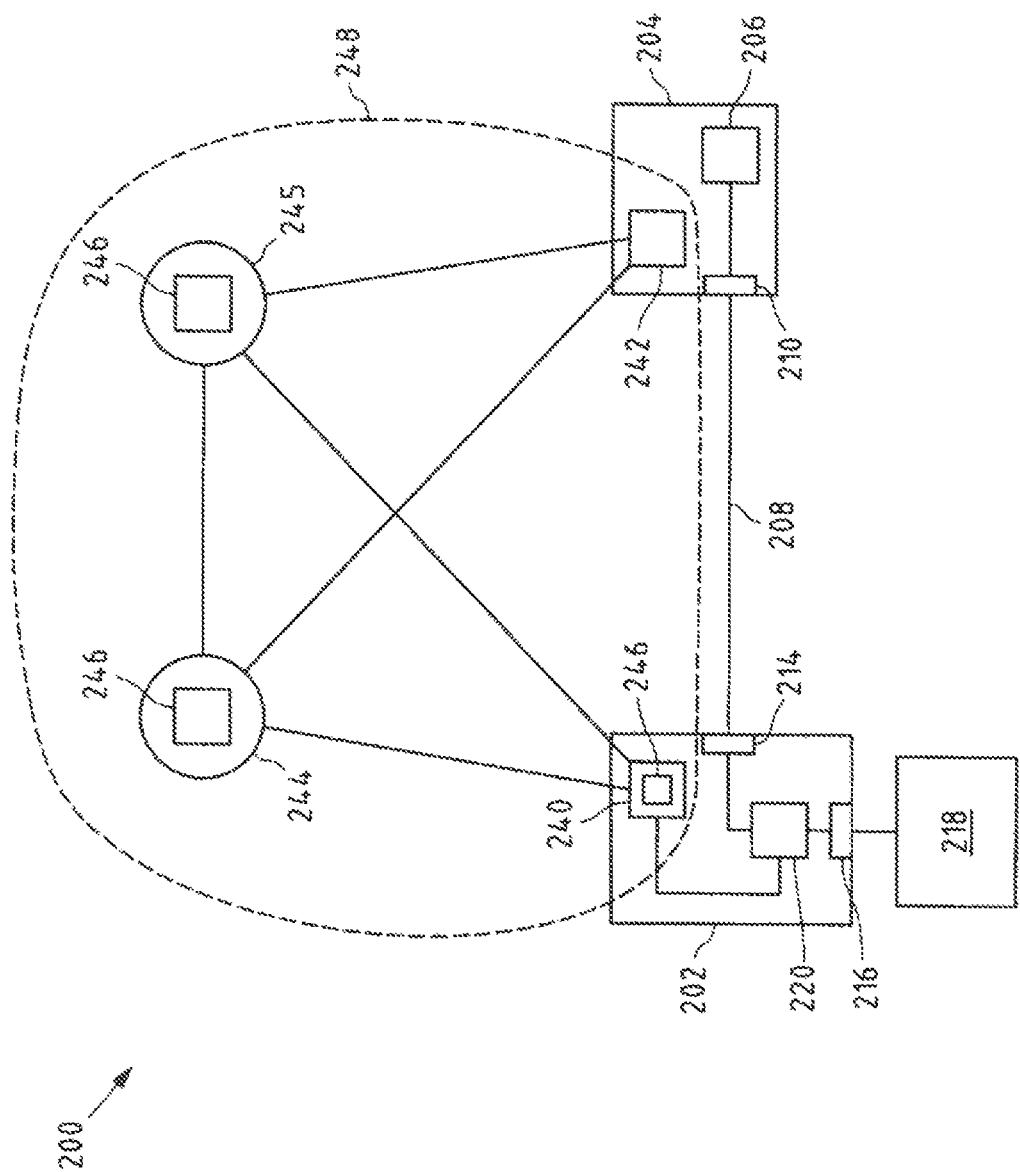
FIG. 2 shows a schematic view of a first embodiment of a supply medium exchange system according to the present invention.

FIG. 2 shows a schematic view of a first embodiment of a supply medium exchange system 200 according to the present invention. The supply medium exchange system 200 is configured to enable an exchange of a supply medium between at least one supply medium exchange station 202 and at least one mobile unit 204 having at least one supply medium storage 206. It shall be understood that in general a supply medium exchange system 200 may comprise a plurality of supply medium exchange stations wherein each of those may be configured to exchange supply medium with one or more mobile units.

Examples of supply media which are not exhaustive are electrical current or electrical power, gaseous media, such as natural gas or a similar (combustible) gas, biomass and solid or liquid fuel. The supply medium exchange system 200 may be configured to enable the exchange of at least one supply medium type.

In order to exchange supply medium, the at least one supply medium exchange station 202 comprises at least one supply medium exchange interface 214 configured to exchange the supply medium. The supply medium exchange interface 214 may be an unidirectional interface 214 or a bidirectional interface 214. For instance, the supply medium exchange interface 214 may be an electrical interface 214 configured to dispense and/or receive electrical power and current, respectively. In another example the supply medium exchange interface 214 may be a gas or fuel dispenser 214.

As can be seen from FIG. 2, the supply medium exchange interface 214 is connectable with at least one supply medium device 218 configured to provide supply medium to the supply medium exchange station 202 and/or to receive supply medium from the supply medium exchange station 202. Preferably, the supply medium device 218 may be a supply medium storage 218, such as a supply medium tank 218, or a supply channel network 218. A supply channel network 218 may at least comprise a physical, grid-based supply channel, such as an electrical line, preferably a plurality of electrical energy lines, or at least one fluid line, e.g. in the form of a pipeline.

Via a connector 216 and a supply medium exchange controller 220, at least an unidirectional supply medium connection between the supply medium exchange interface 214 and the supply medium device 218 can be created. Preferably, the connection may be a bidirectional connection.

The mobile unit 204 may be any mobile unit 204 comprising at least one supply medium storage 206. Preferred examples of mobile units 204 are vehicles, such as cars, trucks, ships, railway vehicles, planes, bicycles, drones, mobile machines, etc. Such a vehicle 204 may be an autonomously operated vehicle 204.

In order to exchange supply medium with a supply medium exchange station 202, the mobile unit 204 comprises at least one (unidirectional or bidirectional) supply medium exchange interface 210. According to one embodiment, the supply medium exchange interface 210 corresponds to the supply medium exchange interface 214 such that a supply medium can be wirelessly exchanged. In another example, a wired supply medium transmission connection 208, such as an electrical cable 208 or a fluid line 208, may be used to transmit the supply medium from the supply medium exchange station 202 to the mobile unit 204 and/or from the mobile unit 204 to the supply medium exchange station 202.

A substantial difference compared with prior art systems, such as the system 100 according to FIG. 1, is that no central instance is provided. At least one of the mobile unit 204 and the supply medium exchange station 202 may be configured to communicate with a peer-to-peer network 248 or a computer-computer network 248. The peer-to-peer network 248 comprises a plurality of nodes 240, 244, 245 or computers 240, 244, 245. It shall be noted that according to other variants also the item 242 may be a node of the peer-to-peer network 248A peer-to-peer network 248 is characterized in the present case in that each node 240, 244, 245 is preferably connected to every other node 240, 244, 245 of the peer-to-peer network 248. In addition, the computers 240, 244, 245 have equal rights, something which distinguishes them from a server-client structure.

The depicted nodes 240, 244, 245 (each) comprise a peer-to-peer application 246. As can be seen from FIG. 2, the same peer-to-peer application 246 is implemented on each node 240, 244, 245. The peer-to-peer application 246 may preferably be a (public) register 246 that can, in particular, be inspected by all participants 240, 242 244, 245 (not only the nodes) of the peer-to-peer network 246. Each node 240, 244, 245 preferably has the (entire) register 246. It may also be envisaged that only part of the register 246 can be provided on a node (light node which does not comprise the full register). In a particularly preferred embodiment, the peer-to-peer application 246 may be a block chain 246.

In order to initiate a supply medium exchange process between the mobile unit 204 and the supply medium exchange station 202, an authentication process can be conducted by means of the peer-to-peer application 246. The authentication process can be initiated by a first peer-to-peer module 242 assigned to the mobile unit 204.

The first peer-to-peer module 242 is configured to communicate at least with the peer-to-peer network 248, i.e. the nodes 240, 244, 245. In other words, the peer-to-peer module 242 or the entity 204 corresponding to this peer-to-peer module 242 is at least a participant 242 of the peer-to-peer network 248. In this case, all participants of the peer-to-peer network 248 are preferably known to each participant of the peer-to-peer network 248.

In the present case, a second peer-to-peer module 240 assigned to the supply medium exchange station is a node 240 or computer 240 in the peer-to-peer network 222. Hence, the peer-to-peer module 240 likewise comprises the peer-to-peer application 246. The first peer-to-peer module 242 (only) comprises a decentral application and an API in order to communicate with the peer-to-peer application 248.

The peer-to-peer application 246 is configured to cause the generation of a supply medium exchange release message for releasing of the exchange of the supply medium between the mobile unit 204 and the supply medium exchange station 202 by means of the peer-to-peer application 248. In particular, in order to cause the generation of a supply medium exchange release message the first peer-to-peer module 242 transmits the peer-to-peer identification of the mobile unit 204 and preferably the peer-to-peer identification of the supply medium exchange station 202 to the peer-to-peer application 246.

Then at least a part of the peers or node computers 240, 244, 245 check or verify whether an exchange of supply medium is allowed between the mobile unit 204 and the supply medium exchange station 202. For instance, it is checked whether the at least one identification received by the peer-to-peer application 246 corresponds to the identification of an entity 202, 204 registered in the peer-to-peer application (e.g. as an asset).

In the case this authorization process is negative the exchange of supply medium will be prohibited. In the case of a positive result the peer-to-peer application 246 generates a supply medium exchange release message. This message is readable or receivable, respectively, by the second peer-to-peer module 246. The second peer-to-peer module 246 then causes the release of an exchange of a supply medium. For instance, the second peer-to-peer module 246 transmits a release signal to a supply medium controller 220 which releases the exchange e.g. by opening a valve or closing a switch.

Furthermore, prior to release of the supply medium exchange process, a supply medium exchange transaction agreement can be generated between the mobile unit 204 and the supply medium exchange station 202 by means of the peer-to-peer application 246.

In order to cause the generation of a supply medium exchange transaction agreement, the first peer-to-peer module 242 may send a request message to the peer-to-peer application 246. A request message may include the following data:

Quantity specification: amount of supply medium, which is desired or made available by a station/mobile unit Time indication: future period, at which the desired supply amount is desired or provided Transaction criterion: criterion that must be met by another station/mobile unit to complete a supply medium transaction agreement about the specified amount and period Control criterion: criterion that must be met for physical delivery (e.g. AC or DC, maximum load current)

It shall be understood that other transaction criteria can be defined. More information can be, for example, a time stamp, a signature of the sender of the message, a message ID of the transaction and other criteria, such as an indication of the desired production or consumption type, meter status information, required reputation factor, price and/or tariff table, etc. In addition, information about the technical status or malfunctions can be displayed.

The second peer-to-peer module 240 may send an acceptance message. An acceptance message may comprise identical or at least similar data details as compared with a request message. Additionally, the acceptance message can comprise a reference indication to the previous request message, such as the ID of the request message. For example, it can be listed in an acceptance message in relation to a request message that a certain and desired amount of supply medium can be delivered for the future period in accordance with the transaction criterion. Furthermore, the acceptance message can indicate that the desired reputation factor can be fulfilled. The amount may be a sub-amount of the requested quantity. The specified time may also be a part-time or sub-time. It can also be given a lower/higher transaction criterion.

If an acceptance message includes only a sub-quantity of the requested quantity, a part-time indication and/or a lower, higher or other transaction criterion, the acceptance message can be called a counter-offer message. This can be accepted by the first entity through an acceptance message. Based on this, the entity, e.g. the peer-to-peer module, may cause the generation of a supply medium exchange transaction agreement.

In particular, there can be multiple request messages and/or accepting messages and/or messages comprising a delivered/consumed quantity parameter of a supply medium of a particular period. Each mobile unit and/or supply medium exchange station can give guidelines, according to which at least one supply medium transaction agreement can be generated. The peer-to-peer application 246 may be configured to generate, based on the messages of a peer-to-peer module, a supply medium exchange transaction agreement. Such an agreement may include a supply medium exchange release message.

A supply medium transaction agreement may be stored within a smart contract in a block. A smart contract may comprise computer program code. In the supply medium transaction agreement, in particular, the exchange or the delivery or receipt of a certain amount of supply medium for a certain time period and/or a transaction criterion as a given price, can be agreed between a first entity comprising a meter and another entity comprising a meter. For example, the first peer-to-peer module can cause the other peer-to-peer module by means of the peer-to-peer application 246 to generate an agreement that the first supply medium exchange station supplies a certain amount X of electrical power for a period $T_x$ (X kW/$T_x$h) to the mobile unit via supply medium connection 208.

For a better illustration, the following embodiments relate to a supply medium exchange system in the form of an electrical supply medium exchange system. However, the invention is not limited thereto. In particular, the following description can be transferred to other supply medium exchange systems, such as gas exchange systems or fuel exchange systems.

Figure 3:
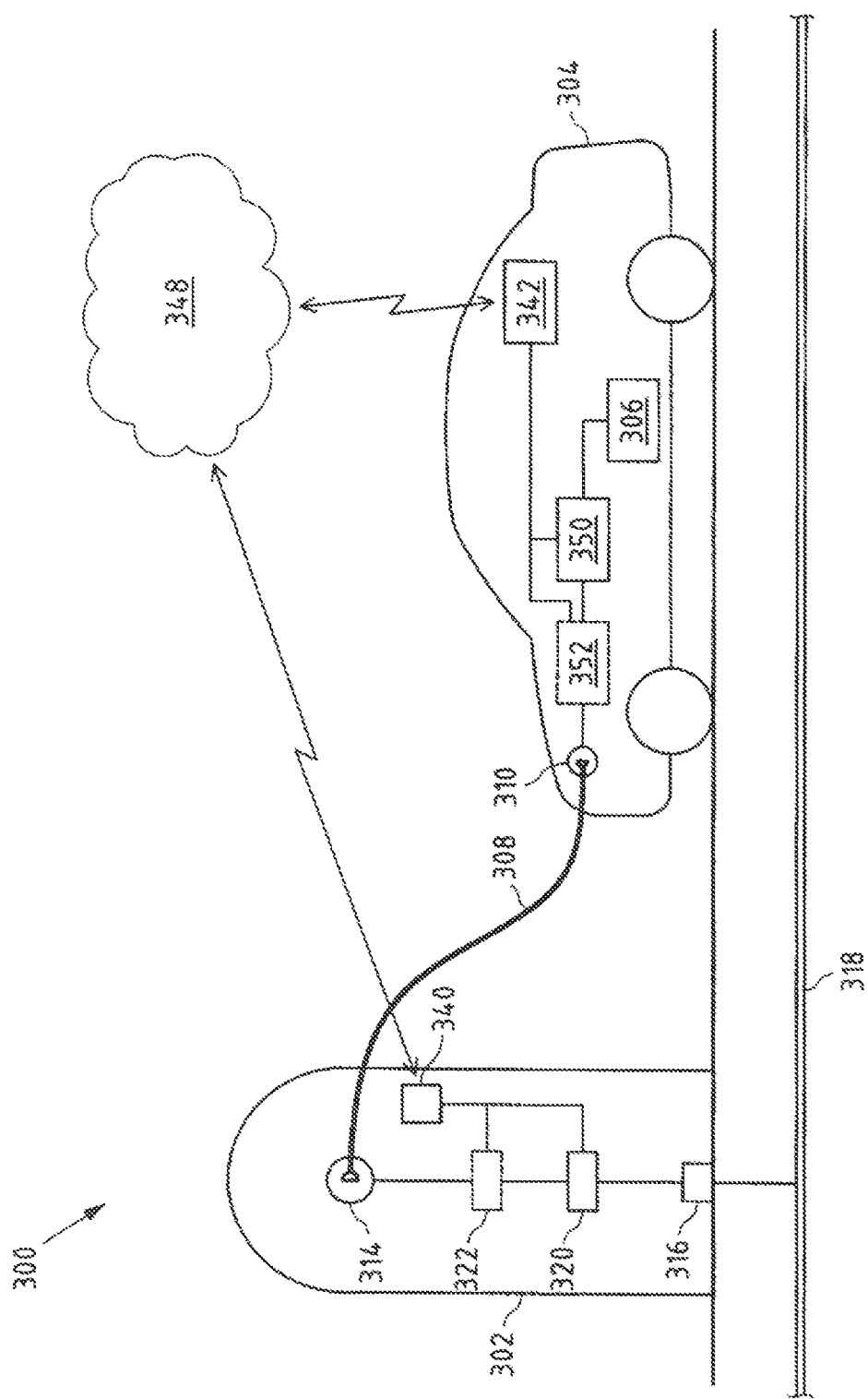
FIG. 3 shows a schematic view of a further embodiment of a supply medium exchange system according to the present invention.

FIG. 3 shows a schematic view of an embodiment of a supply medium exchange system 300. The present supply medium exchange system 300 comprises a supply medium exchange station 302 in form of an electrical charging station 302. The charging station 302 is configured to charge an electrically operated vehicle 302, like an electric car, electric bicycle, drone, water vehicle, etc.

The charging station 302 comprises a connector 316 which provides a connection to an electrical grid 318, such as a public or private grid 318. Furthermore, a load or charging controller 320, an optional meter 322 and a supply medium exchange interface 314 in the form of a charging interface 314 are provided. The charging interface 314 may be a socket configured to receive a port of a charging cable 308. Via the charging cable 308, electrical current can be exchanged between the charging station 302 and the mobile unit 304.

In order to enable the electrical connection to the charging station 302, the mobile unit 304 comprises a charging interface 310. Furthermore, the mobile unit 304 comprises an optional meter 352, a charging controller 350 and an electrical storage 306 in form of a battery 306.

As can be further seen from the FIG. 3 both the charging station 302 and the mobile unit 304 comprise a respective peer-to-peer module 340 and 342. Each of the peer-to-peer modules 340, 342 is configured to communicate with a (not shown) peer-to-peer application of a peer-to-peer network 348. As described above, at least one of the peer-to-peer modules 340, 342 may be a node of the peer-to-peer network 348. The peer-to-peer modules may be (alternatively) connected via at least one gateway to nodes in the peer-to-peer network.

In order to become at least a participant of the peer-to-peer network 348, it may be necessary that an entity, such as the mobile unit 304 and/or the charging station 302, has to perform a registration process with the peer-to-peer application.

In a registration process, at least part of the nodes checks and verifies, respectively, whether e.g. the mobile unit 304 can be trusted. For instance, it can be checked whether the user of the mobile unit 304 has at least a particular amount of cryptocurrency (or a fiat currency). A peer-to-peer identification can be assigned to the mobile unit 304 and the first peer-to-peer module 342 assigned to the mobile unit 304, respectively. The peer-to-peer identification is preferably a unique identification. Furthermore, a reputation factor can be assigned to the identification. The reputation factor is preferably updatable based on future transactions and validations results of these transactions, respectively. Reputation factors can be stored on the block chain and/or in a (decentral) file storage. In addition, technical details about the mobile unit 304 can be saved in the peer-to-peer application, such as a battery type of the mobile unit 304, the maximum capacity of the battery, the maximum and/or minimum charging current, the required charging cable, voltage ranges, whether there exist the possibility to wirelessly exchange electrical power, etc. In a similar manner a charging station 302 can be registered.

As explained above, in order to initiate a charging process, the first peer-to-peer module 342 transmits a charging request message to the peer-to-peer application. In a preferred embodiment prior to the charging process the charging cable 308 can be connected to the respective charging interface 310, 314. The charging cable 308 may be configured to provide a communication connection between the mobile unit 304 and the charging station 302. For instance, at least the peer-to-peer identification of the charging station 302 can be transmitted to the first peer-to-peer module 342 via this communication connection. Further data can be exchanged via the communication connection of the charging cable 308.

Then the first peer-to-peer module 342 transmits a charging request comprising the peer-to-peer identification of the mobile unit 304 and the peer-to-peer identification of the charging station 302 to be used by the mobile unit 304 to the peer-to-peer application. At least a part of the nodes of the peer-to-peer network 348 validates whether the mobile unit 304 is allowed to exchange electrical current with this charging station 302. Furthermore, as described hereinbefore, the mobile unit 304 and the charging station 302 can cause the generation of a supply medium exchange transaction agreement. Then, the electrical current can be exchanged between the mobile unit 304 and the charging station 302.

Figure 4:
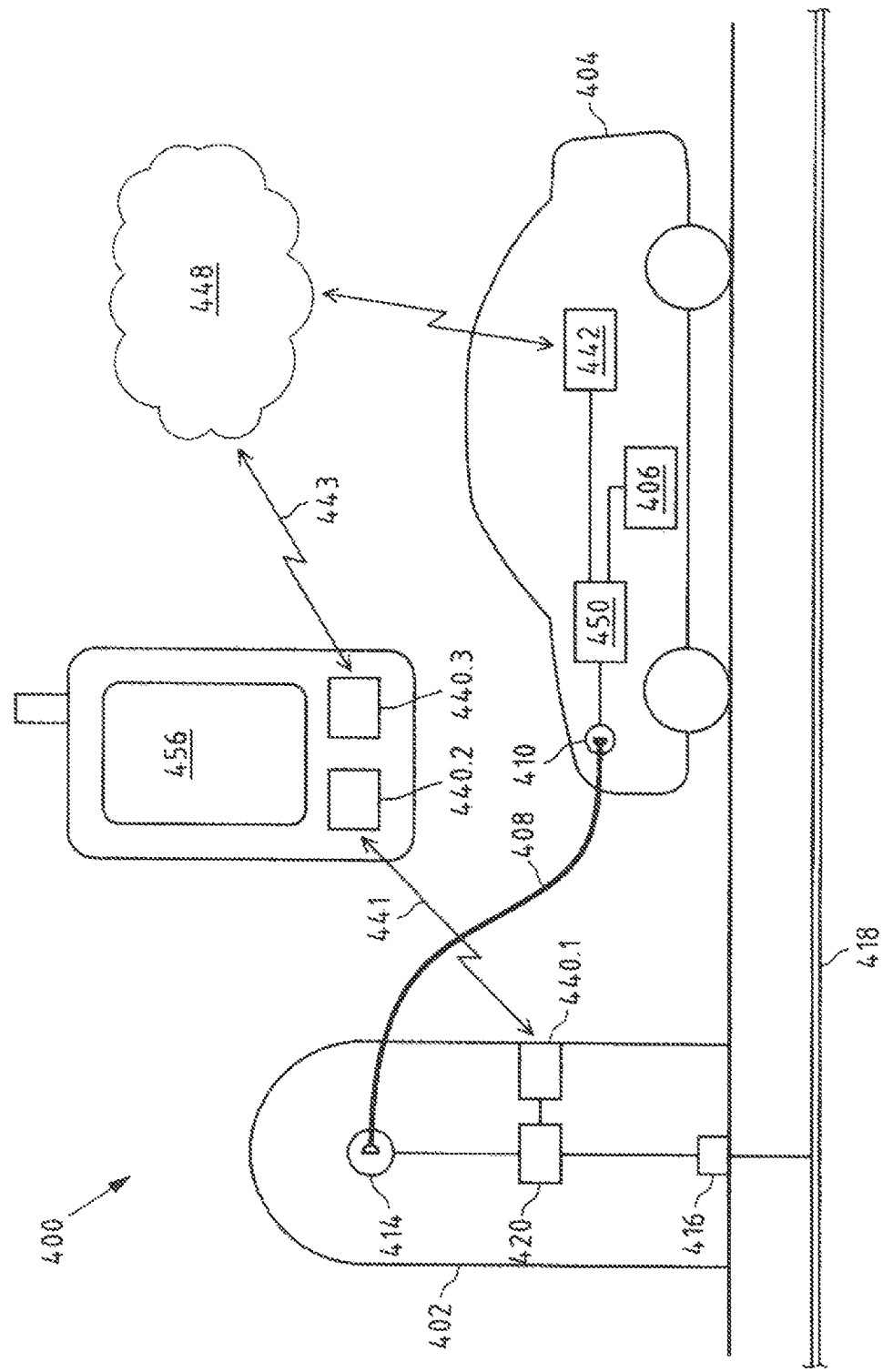
FIG. 4 shows a schematic view of a further embodiment of a supply medium exchange system according to the present invention.

FIG. 4 shows a further embodiment of an electrical supply medium exchange system 400 of the present invention. In order to avoid repetitions, only the differences between the embodiment of FIG. 4 and the embodiment of FIG. 3 are subsequently described.

In contrast to the previous embodiment, the second peer-to-peer module 440.3 assigned to the charging station 402 is included in a mobile communication unit 456.

In a preferred further embodiment, the first peer-to-peer module 442 assigned to the mobile unit 404 may be additionally or alternatively provided within the mobile communication unit 456. In other words, the functioning of the first peer-to-peer module 442 can also be moved into a separate device, such as the mobile communication unit 456. Hence, the mobile unit 404 itself must not comprise a peer-to-peer module.

More particularly, the charging station 402 comprises a connector 416, a charging controller 420, a charging interface 414 and a nearfield communication module 440.1. The nearfield communication module 440.1 is adapted to communicate with the mobile communication unit 456 via a nearfield 441.

The nearfield 441 can be a nearfield 441 in accordance with the NFC standard, the Bluetooth standard, the ZigBee standard, the RFID standard or other wireless standards for the short distance radio communication preferably in the centimeter range.

The mobile communication unit 456 may be a smartphone, a laptop, a smart watch, etc. An exemplified and not exhaustive mobile communication unit 456 may comprise a (touch)screen, and optionally a keyboard. In the mobile communication unit 456 a processor and a communication device for communication over a wide area network connection 443 via an antenna can be provided. The processor may be connected with a nearfield communication module 440.2 and can establish communication via the nearfield 441. The processor may run the peer-to-peer module 440.3 which may be a software module. In a preferred embodiment, the peer-to-peer module 441.3 is formed by a specific decentral application, an API and the peer-to-peer application.

The wide area network connection 443 may be a cellular connection 443. The cellular connection 443 can be formed according to a mobile radio standard, in particular GSM, GPRS, Edge, LTE, CDMA, W-CDMA, CDMA-2000. On the other hand, it is also possible that instead of the cellular connection 443 a wireless network connection can be established, in particular a WLAN connection between the mobile communication unit 456 and the wide area network 443.

As described hereinbefore, the first peer-to-peer module 442 of the mobile unit 404 may cause the peer-to-peer application to generate a charging release message for the charging station 402. The charging release message comprising the unique peer-to-peer identification of the charging station 402 can be read or received by the second peer-to-peer module 440.3 e.g. via the wide area network connection 443. The charging release message or its release information comprising the unique peer-to-peer identification of the charging station 402 can be forwarded to the nearfield communication module 440.2.

In order to transmit the charging release message from the mobile communication unit 456 to the charging station 402, the user has to put the mobile communication unit 456 into the range of the nearfield communication module 440.1. For instance, in order to detect a mobile communication module 456, the nearfield communication module 440.1 can send out an interrogation signal. This may take place in preferably regularly intervals. For example, it is possible that in intervals of 1, 5 or 10 seconds, the interrogation signal can be sent out. It is also possible that an interrogation signal is emitted, for example, from the mobile communication unit 456.

For this reason it is also possible that the communication unit 440.1 preferably permanently monitors the nearfield 441 and the reception of an interrogation signal can be detected. Upon receipt of an interrogation signal a nearfield communication is set up between the communication module 440.1 and the communication module 440.2.

The communication module 440.1 is, in particular, configured to receive a charging release message and signal, respectively, from the communication module 440.2 of the mobile communication unit 456.

Then a respective negotiation can be forwarded to the charging controller 420 from the communication module 440.1. In response to the receipt of this negotiation, an electrical connection between the connector 416 and the charging interface 414 can be established by the charging controller 420.

Preferably, the charging release message may comprise additional information, such as the peer-to-peer application of the charging station 402, a previously described time indication and/or a previously described quantity specification. Preferably, at first, e.g. the charging controller 420 can check the received identification. Then, in accordance with the received time indication and/or quantity specification, the charging controller 420 can control the delivery or reception of electrical current.

As described hereinbefore, it shall be understood that according to other variants of the present invention, the first peer-to-peer module 442 assigned to the mobile unit 404 may be additionally or alternatively provided within the mobile communication unit 456. In this case, the peer-to-peer module 442 may be configured to create a (secure) connection with a (not shown) meter of mobile unit. In one embodiment, the mobile communication unit 456 may comprise both peer-to-peer modules 442, 440.3 e.g. each in form of a (separate) software module, as described hereinbefore.

Figure 5:
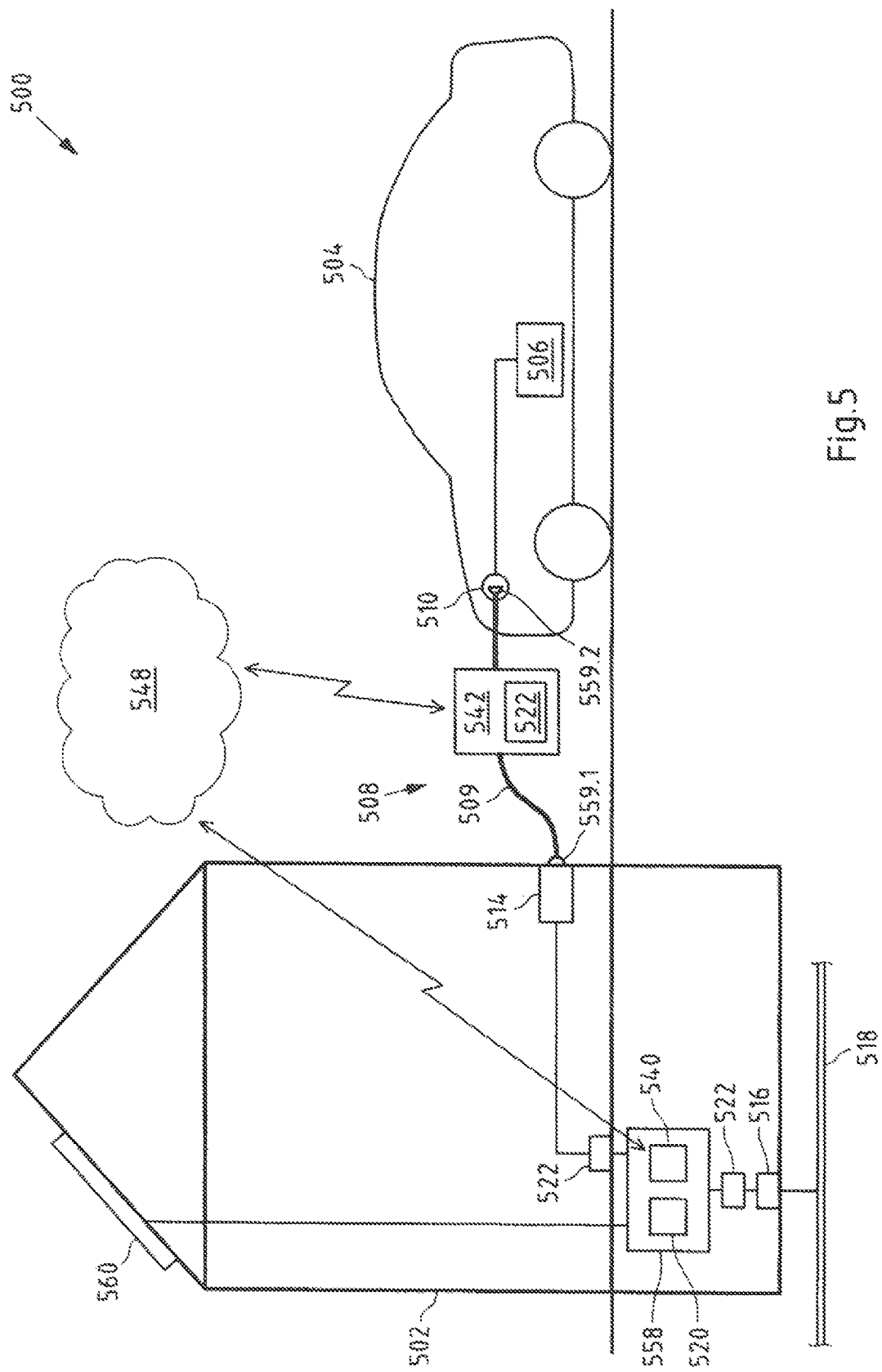
FIG. 5 shows a schematic view of a further embodiment of a supply medium exchange system according to the present invention.

FIG. 5 shows a further embodiment of an electrical supply medium exchange system 500 of the present invention. In order to avoid repetitions, only the differences between the embodiment of FIG. 5 and the embodiments of FIGS. 3 and 4 are subsequently described.

In contrast to the previous embodiments, the charging station 502 is formed by a building 502, which can comprise a private household or be formed by a charging socket next to a private parking space. For instance, the owner of the building 502 can offer that mobile units 504 can use an electrical charging interface 514, such as a socket 514, of the building 502. In other words, a user can sell supply medium to users of mobile units 504. Each of users or their respective peer-to-peer modules 542, 540 may be at least participants of the peer-to-peer network 548.

As can be further seen, the building 502 has an own supply medium producer 560 in form of a photovoltaic device 560. It shall be understood that alternatively or additionally other electrical generators, like a micro-CHP (combined heat and power), (small) wind turbines, etc., can be provided.

Preferably, the peer-to-peer module 540 may be arranged in the control cabinet 558 of the building 502. The peer-to-peer module 540 may be additionally configured to control the delivery/reception of electrical current via the charging interface 514. In the shown embodiment, a controller 520 is provided. Further, in the present example two meters 522 are provided in order to separately measure the respective power flow.

Furthermore, FIG. 5 shows an embodiment of a supply medium transmission connection 508 according to the present invention. The present supply medium transmission connection 508 is a charging cable 508. The charging cable 508 comprises a first supply medium port 559.2 corresponding to a supply medium exchange interface 510 of a mobile unit 504 and a further supply medium port 559.1 corresponding to the supply medium exchange interface 514 of the supply medium exchange station 502. The ports 559.1, 559.2 are connected by a power line 509.

In the present embodiment, the first peer-to-peer module 542 assigned to the mobile unit 504 is a part of the supply medium transmission connection 508. For instance, in order to avoid the integration of the first peer-to-peer module 542 in the mobile unit 504, the first peer-to-peer module 542 can be integrated in the charging cable 508. The particular advantage is that a mobile unit 504 which does not (originally) comprise a peer-to-peer module, can be easily updated by using a cable 508 comprising the first peer-to-peer module 542. Preferably, the peer-to-peer module 542 may also comprise a meter 522.

The first peer-to-peer module 542 is configured to cause a generation of a supply medium exchange release message for releasing of the exchange of the supply medium between the mobile unit 504 and the supply medium exchange station 502 by means of the peer-to-peer application, as described hereinbefore.

Figure 6:
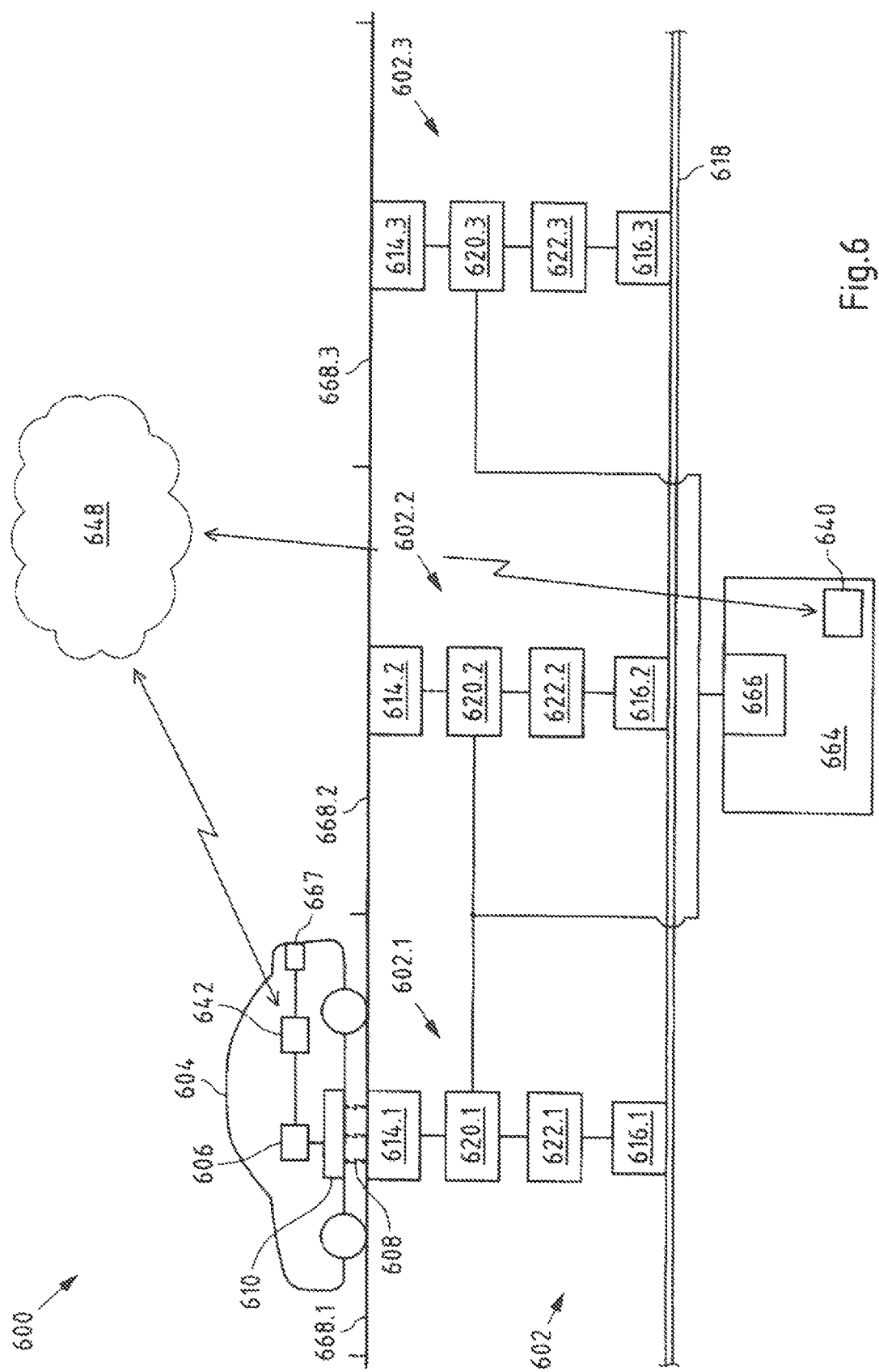
FIG. 6 shows a schematic view of a further embodiment of a supply medium exchange system according to the present invention.

FIG. 6 shows a further embodiment of an electrical supply medium exchange system 600 of the present invention. In order to avoid repetitions, only the differences between the embodiment of FIG. 6 and the embodiments of FIGS. 3, 4 and 5 are subsequently described.

In contrast to the previous embodiments, the supply medium exchange station 602 comprises a central controlling module 664 and three supply medium exchange substations 602.1 to 602.3. As can be seen from FIG. 6, each of the substations 602.1 to 602.3 comprises a supply medium exchange interface 641.1 to 614.3, a sub-controller 620.1 to 620.3, a meter 622.2 to 622.3 and a connector 616.1 to 616.3 to the electrical grid 618. Moreover, separate parking spaces 668.1 to 668.3 are assigned to the respective substations 602.1 to 602.3.

In a preferred embodiment, each parking space 668.1 to 668.3 can be provided with a (not shown) access device. For instance, the access device can comprise a gate and a reading device (e.g. RFID reader or the like) which can be connectable e.g. to the second peer-to-peer module 640 or comprises an additional peer-to-peer module.

In addition, the mobile unit 604 may comprise a coding unit 667 (e.g. a RFID tag). It shall be understood that the coding unit 667 can be (uniquely) assigned to the mobile unit 604 and e.g. comprised by a mobile communication unit of the user of the mobile unit 604. In the coding unit 667, preferably, the peer-to-peer identification of the mobile unit 604 can be stored. It is also possible that the coding unit 667 comprises a peer-to-peer module.

In order to enter or access a parking space, the reader of the access device can read out at least said identification from the coding unit 667. The identification can be sent to the peer-to-peer application of the peer-to-peer network 648 for verification. In the case, at least a part of the nodes of the peer-to-peer network 648 validates the received identification the peer-to-peer application and can generate an access message. After receipt of the access message e.g. via the second peer-to-peer module 640 the access device can cause the gate to open. Then the mobile unit 604 can enter the respective parking space 668.1 to 668.3.

In this embodiment (but also in each of the other embodiments) a supply medium station and/or at least one supply medium exchange substation comprises a (not shown) coding device. The function of the coding device will be explained in connection with the embodiment of FIG. 6. A coding device may by a QR Code, a RFID tag/reader, and or other near-field communication devices. Preferably each of supply medium exchange substations 602.1 to 602.3 may have such a device. By reading the coding device the mobile unit 604 can authorize itself via the block chain at the correct supply medium exchange substations 602.1 to 602.3. This may be particular important when several mobile units are entering parking space 668.1 to 668.3 at the same time in order to assign the correct mobile units with the respective supply medium exchange substations 602.1 to 602.3.

In case the authorization process is triggered by a supply medium exchange substations 602.1 to 602.3, a scanning unit can scan a QR code of an App or a code from a coding unit 667 of mobile unit 604.

In a further embodiment the system or peer-to-peer application is connected with a mobile phone in order to display battery charging, energy usage, time to full charging and price information to the user of the mobile unit and information about the technical status or malfunctions.

In alternative embodiments, the assignment process can be manually performed (e.g. manually inputting a code).

The first peer-to-peer module 642 may cause the generation of a supply medium exchange release message for releasing of the exchange of the supply medium between the mobile unit 604 and in particular respective sub-station 602.1 to 602.3 by means of the peer-to-peer application as described hereinbefore. In addition, a supply medium exchange transaction agreement can be generated as described above.

After receipt of a supply medium exchange release message by the second peer-to-peer module 640 assigned to the charging station 602 from the peer-to-peer network 648, the central controller can control the respective sub-controller 620.1 to 620.3 via a communication interface 666.

As can be further seen from FIG. 6, in the present embodiment the electrical power is wirelessly exchanged between the charging interfaces 610 and 614.1 to 614.3.

It shall be understood that the features of the above embodiments can be combined in an arbitrary way.

Figure 7:
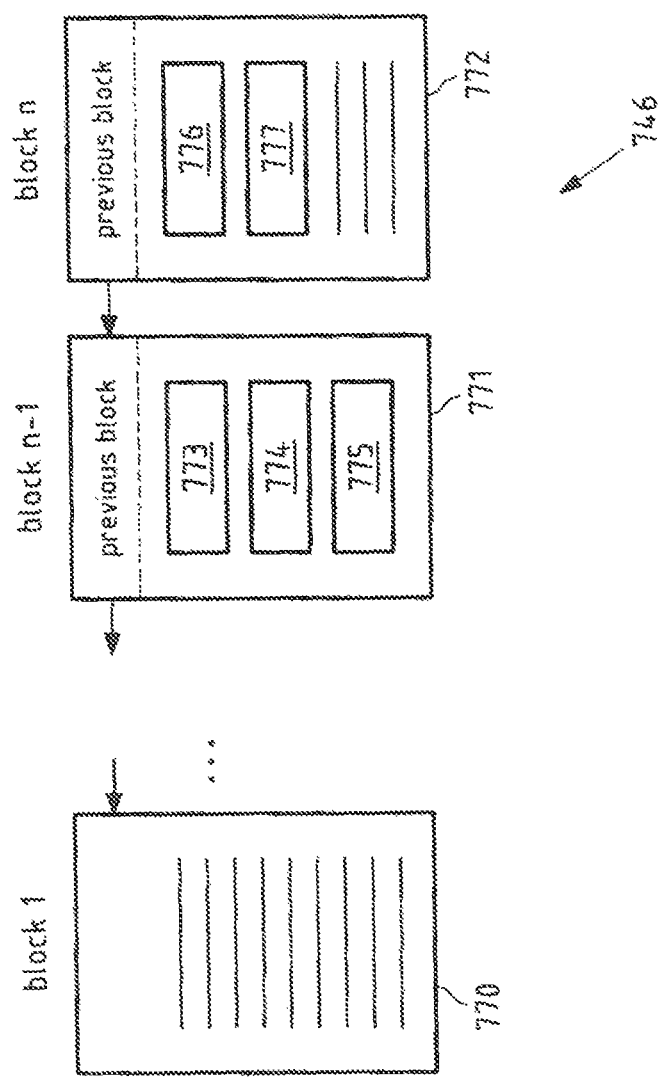
FIG. 7 shows a schematic view of an embodiment of a peer-to-peer application according to the present invention.

FIG. 7 shows a schematic view of an embodiment of a peer-to-peer application 746 according to the present invention. The peer-to-peer application 746 is a register readable, in particular, by the participants of the peer-to-peer network, such as the first and/or second peer-to-peer network. Thereby, messages can be written and/or read into/from the register by a peer-to-peer module of an entity and/or any other participants in the peer-to-peer network. In a preferred embodiment, the peer-to-peer application 746 may be a block chain 746.

Hereinafter, it is assumed in the following description of the present embodiment that the at least one peer-to-peer application 746 is a block chain 746. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In alternative embodiments of the peer-to-peer application the block chain can be a permissionless or permissioned block chain. In a specific case the block chain can be public, consortium or private block chain.

In a further embodiment, the peer-to-peer application can be formed with multiple block chains which are connected via mechanisms such as side chains.

The block chain 746 is formed by at least one block 770 to 772, preferably by a plurality of interconnected blocks 770 to 772. The first block 770 may also be called genesis block 770. As can be seen, a block 771, 772 (except for the first block 770) refers to each previous block 770, 771. A new block can be created by a computationally intensive process (for example, so called "mining" or through another appropriate process) and will be particularly provided to all participants of the peer-to-peer network.

The present block chain 746 is particularly adapted to receive messages from a peer-to-peer module of a supply medium exchange station or mobile unit, or from another peer-to-peer device of another participant of the peer-to-peer network and to save this message in the block chain 746. Furthermore, the block chain 746 is configured to generate messages e.g. based on a validations process.

In particular, a (newly) received message can be saved and published in the current block 772 of the block chain 746. Due to the configuration of a block chain 746 as a public register 746, the message of a peer-to-peer module of an entity can be read by preferably all participants of the peer-to-peer network.

In the present block chain 746 different types of messages, for example, within a smart contract (algorithm and/or storage at the block chain 746) can be processed and/or stored. By way of example, the message 773 comprises a generated supply medium exchange transaction agreement.

Another message 774 can be a supply medium exchange release request message 774 for releasing a supply medium exchange process. A request message 774 may comprise the peer-to-peer identification of the requesting mobile unit and of the desired supply medium exchange station.

Before generating a supply medium exchange release message 775 at least the received identifications can be verified, as explained above. The verification can include whether reputations factors assigned to the involved entities meet the requirements predefined by the involved entities. For instance, the supply medium exchange can predefine that only mobile units are allowed to use the supply medium exchange station if the reputation factor of the mobile unit is in a predefined admissible reputation factor range. User feedback can be included in the reputation factor as well. User feedback will be captured e.g. via a smartphone application. It shall be understood that also the mobile unit can predefine a respective reputation factor range. It shall be further understood that the reputation factor range can be formed by at least one reputation factor limit. The respective reputation factors can be stored within the block chain 746 and/or a smart contract of the block chain 746 can be configured to access a database comprising the reputation data of preferably all participants of a peer-to-peer network.

The supply medium exchange release message 775 can be a separate message or e.g. part of a supply medium exchange transaction agreement 773. The supply medium exchange transaction agreement 773 may comprise details about the exchange of the supply medium. In one embodiment a time indication and a transaction criterion, such as a particular amount of cryptocurrency to be transferred after a successful exchange of the supply medium from the mobile unit to the supply medium exchange station (or vice versa) (or between the respective users). Preferably, at least a part of the agreed amount of cryptocurrency can be locked by the peer-to-peer application prior to the exchange of the supply medium. A time indication may be sufficient if it is clear which amount of supply medium can be transferred per time unit. Then a meter is not necessary.

In addition, the supply medium exchange transaction agreement 773 can comprise a previously described quantity specification. It shall be understood that other transaction criteria can be defined. Further, more information can be, for example, a time stamp, a signature of the sender of the message, a message ID of the transaction and other criteria.

Furthermore, after a supply medium exchange process, the meter data 776 can be written into the block chain 746. For instance, in the case each of the entity comprises a meter the respective meter data 776 can be written into the block chain 746. Preferably, at least the mobile unit and the supply medium exchange station can verify the exchanged amount of supply medium. If a deviation is detected it can be checked which of the meter data is correct and a respective correction can be performed by means of the block chain 748. In addition, the respective reputation factors of the mobile unit and the supply medium exchange station can be adapted (e.g. reduced if the result was negative or increased if the result was positive) depending of the verification result.

After an exchange of the supply medium, an agreed transaction criterion transaction 777 can be generated and performed by means of the block chain 746. For instance, an agreed amount of a crypto currency can be transferred from the first mobile to the supply medium exchange station (or vice versa). Also this can be verified by the peer-to-peer network, in particular, the participants of the peer-to-peer network.

In particular, the peer-to-peer application 746 is configured to save the messages 773 to 777 in a tamper-proof manner. This is done essentially by the fact that through the entire peer-to-peer network, for example, an agreement or message or meter data can be verified by the cumulative calculation power of the entire peer-to-peer network.

Preferably, at least the above described messages, such as the agreements and other messages, can be hashed together in pairs in a block of the block chain by a Merkle tree. In particular, only the last hash value, the so-called root hash, is noted as a checksum in the header of a block. Then, the block can be coupled with the previous block. Chaining of the blocks can be performed using this root hashes. Each block can include the hash of the entire previous block header in its header. This makes it possible to clearly define the order of the blocks. In addition, this may also prevent the subsequent modification of previous blocks and the messages stored in the previous blocks, since, in particular, the hashes of all subsequent blocks would have to be recalculated in a short time.

In addition, data feeds can be provided by the peer-to-peer application (so called smart oracles, e.g. information about prices, weather, etc.).

Figure 8:
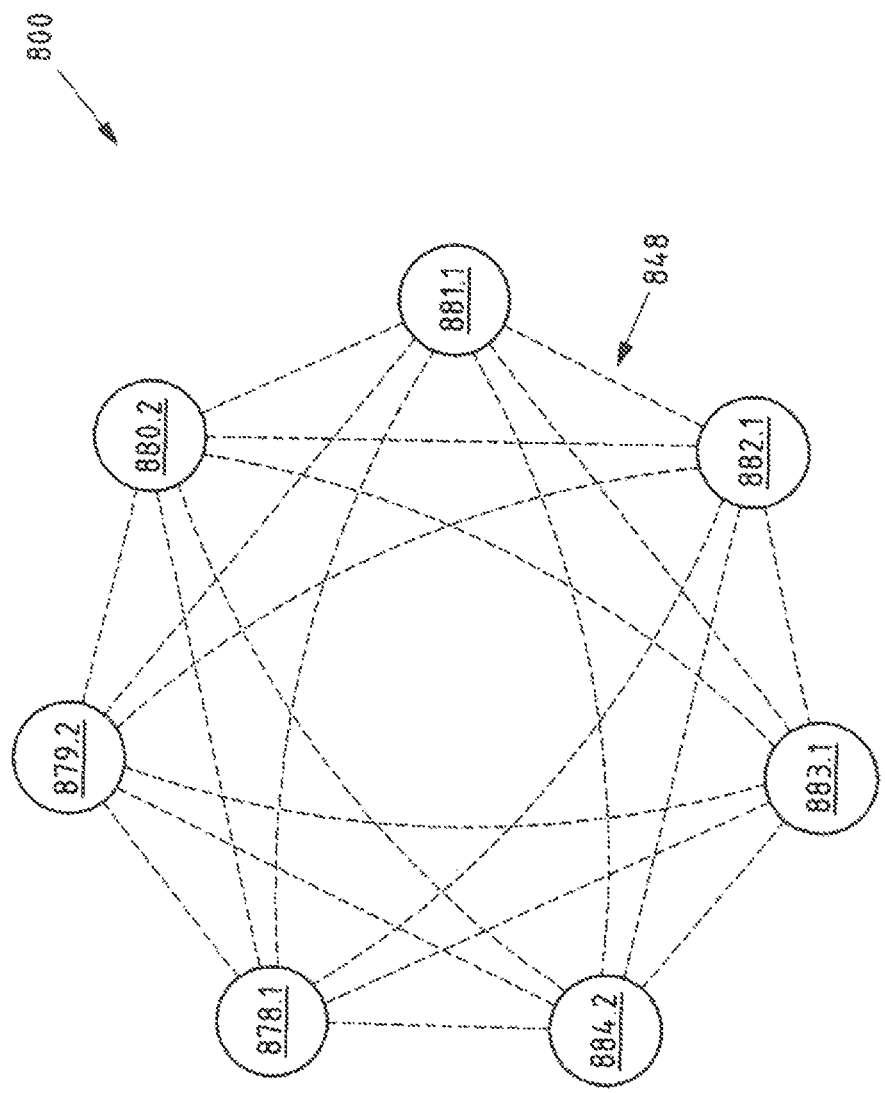
FIG. 8 shows a schematic view of a further embodiment of a supply medium exchange system according to the present invention.

FIG. 8 shows a schematic view of another embodiment of a supply medium exchange system 800 of the invention. In the present embodiment only nodes and participants 878.1 to 883.2 of the peer-to-peer network 848 are shown. In the present example, it is assumed that all nodes 878.1 to 883.2 comprise the peer-to-peer application.

The node 878.1 may be a supply medium exchange station and the second peer-to-peer module of the supply medium exchange station, respectively. The node 879.2 may be realized by a peer-to-peer module integrated in a mobile unit. Node 880.2 may be the peer-to-peer module of a supply medium transmission connection. Further node 881.1 may be (smart) electrical consumer, such as an IoT device. Node 882.1 may be realized by a mobile communication unit comprising a peer-to-peer module. The node 883.1 may be integrated in a household or building. Eventually, node 884.2 may be a computer.

As can be seen, two different types of peers or node computers 878.1, 881.1, 882.1, 883.1 and 879.2, 880.2, 884.2 are presently illustrated. All peers 878.1, 881.1, 882.1, 883.1 and 879.2, 880.2, 884.2 are comprised by the peer-to-peer network 848. In the present embodiment, however, only a part of the peers 878.1, 881.1, 882.1, 883.1 and 879.2, 880.2, 884.2, in the present case, the peers 878.1, 881.1,

882.1, 883.1, check the validity of the data stored in the peer-to-peer application messages, such as the meter data, request messages, identification data and/or supply medium exchange transaction agreements. Furthermore, only a part of the entire peers can be configured to store the peer-to-peer application and/or only a part of the peers can be configured to execute the algorithms of a smart contract. Since the validation/verification of e.g. identification data requires a considerable computational effort, it may be advantageous for reasons of efficiency, if only a part of the peers 878.1, 881.1, 882.1, 883.1, especially particularly powerful peers 878.1, 881.1, 882.1, 883.1, perform the validation and/or optimization algorithms taking more complex pricing or the state of the supply system network into consideration (e.g. mobile units putting back a supply medium into the network via the charging station). Validation and optimization can be done on-chain or off-chain. Off-chain validation can be managed by the peer-to-peer application, like the code on the block chain. Powerful means in particular a high computing power. In other words, in the present case a valid entry in the peer-to-peer application, such as a block chain, is assumed if (only) a part of the peers 878.1, 881.1, 882.1, 883.1 comes to a positive result. It shall be understood that only a single, especially particularly powerful peer can perform the validation process.

Similarly, in an alternative (not shown) embodiment a particularly large peer-to-peer network may be divided in two or more clusters. In a corresponding peer-to-peer network, for example, a validation will only be carried out by the members of one cluster. In a further embodiment the peer-to-peer application can be formed using multiple block chains. These block chains are connected via frameworks such as sidechains.

Figure 9:
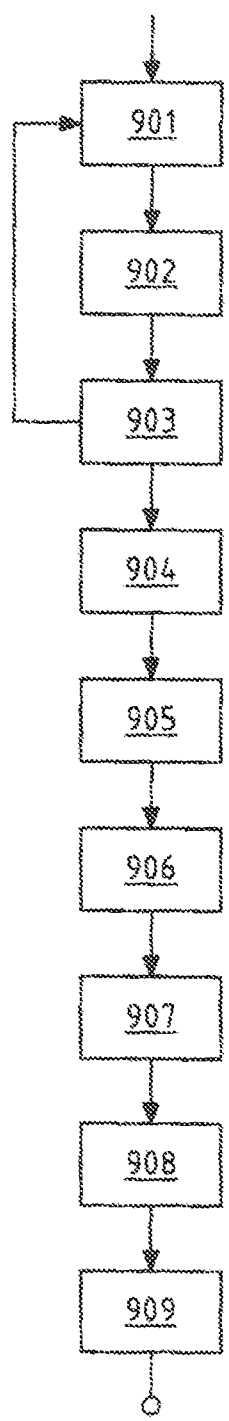
FIG. 9 shows a diagram of an embodiment of a method according to the present invention.

In the following, an exemplified method according to the present invention for initiating a charging process is described. FIG. 9 shows a diagram of an embodiment of a method according to the present invention. It shall be understood that the order of the steps may be varied and that at least some of the steps are optional steps.

Furthermore, the method will be explained by means of an electrical supply medium exchange system enabling the charging of a vehicle of a user by a charging station. In particular, in the case of an autonomous vehicle, the subsequently described steps can be automatically performed by the autonomous vehicle.

In a first step 901, a user who desires to charge the vehicle of the user may search for a suitable charging station. By means of the first peer-to-peer module assigned to the vehicle (and user, respectively) the peer-to-peer identification of the vehicle and preferably the current position (e.g. GPS coordinates) of the vehicle can be transmitted to the peer-to-peer application. The peer-to-peer application and a respective code of the peer-to-peer application may be configured to determine one or more potential charging stations depending on the received identification and preferably of the location data of the vehicle and/or user context (e.g. preference how the user wants to spend the time while charging; or maximum available time for charging and a selection which charging stations can provide high load currents to meet the time constraint). This means that charging stations within a predifinable radius (e.g. x km) of the location of the vehicle and charging stations which are permitted to be used by said vehicle (depending on the peer-to-peer ID of the vehicle) can be determined. In addition, also the reputation factors and/or predefined preferences of the user of the vehicle or vehicle itself can be taken into account. This information can be read out by the first peer-to-peer module. The respective information can be provided to the user e.g. via a display, like a display of the vehicle or of a mobile communication unit. For instance, a map comprising the determined available charging stations provided with reputation data can be displayed.

In the next step 902, the charging station selected by the user can be reserved. In particular, the first peer-to-peer module can send a reservation request comprising the peer-to-peer identification of the charging station, the peer-to-peer identification of the mobile unit and e.g. the time period to be reserved to the peer-to-peer application.

By means of a code of a smart contract, the reservation request is analyzed by the peer-to-peer application and a respective reservation message is generated (step 903). The respective reservation message can be read by the second peer-to-peer module assigned to the selected charging station. The reservation can be confirmed by the second peer-to-peer module.

After the successful reservation of a charging station, the peer-to-peer application can generate a respective notification readable by the first peer-to-peer module. Otherwise, the peer-to-peer module can be informed that the reservation failed. Then the method can be continued with step 901.

After the vehicle has arrived at the charging station, in step 904 the first peer-to-peer module causes a generation of a supply medium exchange release message for releasing of the exchange of the supply medium between the mobile unit and the supply medium exchange station by means of the peer-to-peer application. Optionally, as described above, an access process can be conducted by means of the peer-to-peer application, access device and coding unit prior to step 904.

Preferably, the first peer-to-peer module sends a respective request comprising at least the peer-to-peer identification of the vehicle and the selected charging station. In addition, in particular in order to cause the generation of a supply medium exchange transaction agreement comprising the generation of a supply medium exchange release message, further data, such as desired amount of electrical power, technical details of the vehicle (may also be known from the peer-to-peer application), a transaction criterion (e.g. an amount of cryptocurrency for the purchase of the desired amount of electrical power), control criterion, prices/tariff tables, etc. can be transmitted to the peer-to-peer application. By means of the processing power of at least a part of the nodes and the respective code of the peer-to-peer application, the identifications are verified. Furthermore, the charging station may send an acceptance message. Then, a respective supply medium exchange transaction agreement can be generated by the peer-to-peer application.

This may result in the generation of a release message readable by the second peer-to-peer module (step 905). The second peer-to-peer module may forward the release information to a charging controller which creates an electrical connection such that the electrical power can be exchanged. By way of example, according to the agreed amount of electrical power, electrical power can be transferred from the charging station to the vehicle (or vice versa).

During the charging process the system or peer-to-peer application may be connected with a mobile phone (of the user of the mobile vehicle) in order to display e.g. battery charging, energy usage, time to full charging and price information and information about the technical status or malfunctions.

After the termination of the charging process, meter data measured by the meter of the charging station and/or meter data measured by the meter of the vehicle can be transmitted in step 906 to the peer-to-peer application. The meter data can be checked on-chain and/or off-chain (step 907). For instance, a network operator announces the actually measured meter values subsequently, for example once a month, week, etc., based on the meter data and makes an adjustment from this to the supply medium quantity actually exchanged in respect of the quantities measured in the peer-to-peer application. This adjustment may also be offset by means of the peer-to-peer application and, for example, between the entities.

The result of the check can be used in step 908 to adapt the reputation factors of the vehicle (and vehicle's user, respectively) and the charging station by means of the peer-to-peer application. In addition, further feedback data provided by the vehicle (and vehicle's user, respectively) and the charging station by means of the respective peer-to-peer modules can be taken into account.

Eventually, in step 909 a billing process can be conducted. It can be checked in each case by means of the peer-to-peer application, whether the supply medium quantity was exchanged in accordance with the supply medium transaction agreement between the vehicle and the charging station. For example, the amounts of power measured by the respective meters of the entities can be reviewed and/validated by at least a part of the peers of the peer-to-peer network. For instance, it can be checked whether the delivered and received power correspond to the agreed amount of power in the supply medium transaction agreement (this may be already performed in step 907).

Depending on the check result, the vehicle can transfer the entire (or only a part) of the agreed price in the form of crypto money. The charging station receives the transferred crypto money. This shall be carried out in accordance with previous statements by the peer-to-peer application, in particular, in a tamper-proof manner. Especially, a plausibility test as described above can be carried out by at least a portion of the peers. It shall be understood that also the billing process can be taken into account by adapting a reputation factor.

Preferably, the entire peer-to-peer network can check by cumulative processing power, whether the measured power amounts are correct and/or the transfer has been carried out correctly, for example whether the first entity was in fact the owner of the crypto money or the like.

Generally, the present system has the ability to validate individual data by nodes in the peer-to-peer network which is the basis for a "trustless" model. No trust in a central authority is needed. Validation and e.g. optimization of the peer-to-peer application or peer-to-peer matching can be done on-chain or off-chain, as described hereinbefore. Off-chain means that the process is controlled by the block chain. The process itself can be performed by other devices, such as servers/cloud. The block chain can check whether e.g. in the case of a validation process a plurality of servers provides a positive result or a negative result.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A supply medium exchange system, comprising:
   at least one supply medium exchange station comprising at least one supply medium exchange interface configured to exchange a supply medium with at least one mobile unit comprising at least one supply medium storage,
   wherein the supply medium is electricity, gas, or fuel,
   wherein the mobile unit is a vehicle, and
   at least one first peer-to-peer module assigned to the mobile unit and configured to communicate with at least one peer-to-peer application of at least one peer-to-peer network,
   wherein the peer-to-peer network comprises a plurality of nodes,
   wherein the same peer-to-peer application is implemented on each node,
   wherein the first peer-to-peer module is configured to cause a generation of a supply medium exchange release message for releasing of the exchange of the supply medium between the mobile unit and the supply medium exchange station by means of the peer-to-peer application, wherein the peer-to-peer application is configured to generate the supply medium exchange release message after a positive verification check of the first peer-to-peer module performed by means of the peer-to-peer application and by at least a part of the nodes of the peer-to-peer network,
   wherein the peer-to-peer application is a decentral register readable by all participants,
   wherein the peer-to-peer application comprises encryption means and/or signature means and/or verification means, wherein at least one means of the encryption means and/or signature means and/or verification means is configured to store at least a supply medium exchange release message, wherein the peer-to-peer application comprises at least one reputation store and/or is configured to access at least one reputation store, wherein the reputation store comprises at least one of the peer-to-peer identification of at least one mobile unit and/or the peer-to-peer identification of at least one supply medium charging station together with a reputation factor, and wherein the peer-to-peer application is configured to update the at least one reputation factor based on a validation result.

2. The supply medium exchange system according to claim 1, wherein the supply medium exchange system comprises at least one second peer-to-peer module assigned to the supply medium exchange station, wherein the second peer-to-peer module is configured to receive the supply medium exchange release message from the peer-to-peer application, and wherein the second peer-to-peer module is configured to cause the release of the exchange of the supply medium between the mobile unit and the supply medium exchange station based on the received supply medium exchange release message.

3. The supply medium exchange system according to claim 1, wherein in order to cause the generation of a supply medium exchange release message the first peer-to-peer module is configured to transmit a supply medium exchange request message to the peer-to-peer application, wherein the supply medium exchange request message comprises at least a peer-to-peer identification assigned to the mobile unit and/or a peer-to-peer identification assigned to the supply medium exchange station.

4. The supply medium exchange system according to claim 2, wherein the first peer-to-peer module is configured to cause a registration of the mobile unit in the peer-to-peer application by transmitting a registering message comprising at least an identification assigned to the mobile unit, and/or the second peer-to-peer module is configured to cause a registration of the supply medium exchange station in the peer-to-peer application by transmitting a registering message comprising at least an identification assigned to the supply medium exchange station.

5. The supply medium exchange system according to claim 2, wherein the mobile unit and the supply medium exchange station are configured to establish a communication connection between the mobile unit and the supply medium exchange station for exchanging information data, wherein at least one of the first peer-to-peer module and the second peer-to-peer module is configured to transmit the exchanged information data to the peer-to-peer application.

6. The supply medium exchange system according to claim 2, wherein at least one of the supply medium exchange station and the mobile unit comprises at least one meter configured to measure the exchanged amount of the supply medium between the supply medium exchange station and the mobile unit, and at least one of the first peer-to-peer module and second peer-to-peer module is configured to transmit the measured amount of the supply medium to the peer-to-peer application.

7. The supply medium exchange system according to claim 2, wherein the supply medium exchange system comprises at least one mobile communication unit comprising at least one of the first peer-to-peer module and the second peer-to-peer module, and wherein the mobile communication unit comprises at least one first nearfield communication module configured to communicate with at least one second nearfield communication module of at least one of the supply medium exchange station and the mobile unit.

8. The supply medium exchange system according to claim 1, wherein each computer node in the peer-to-peer network comprises at least a part of the peer-to-peer application.

9. The supply medium exchange system according to claim 1, wherein the peer-to-peer application comprises encryption means and/or signature means and/or verification means, wherein at least one means of the encryption means and/or signature means and/or verification means is configured to store at least a supply medium exchange release message.

10. The supply medium exchange system according to claim 1, wherein the peer-to-peer application is a block chain or a decentral ledger comprising at least two blocks connected to one another.

11. The supply medium exchange system according to claim 1, wherein at least a part of the computer nodes and/or participants of the peer-to-peer network are configured to validate at least one message received and/or generated by the peer-to-peer application.

12. A supply medium exchange station, comprising:

at least one supply medium exchange interface configured to exchange a supply medium with at least one mobile unit comprising at least one supply medium storage, wherein the supply medium is electricity, gas, or fuel, wherein the mobile unit is a vehicle, at least one second peer-to-peer module assigned to the supply medium exchange station, wherein the second peer-to-peer module is configured to receive the supply medium exchange release message from the peer-to-peer application, and wherein the second peer-to-peer module is configured to cause the release of the exchange of the supply medium between the mobile unit and the supply medium exchange station based on the received supply medium exchange release message, such that the supply medium exchange release message is generated after a positive verification check of the first peer-to-peer module performed by means of the peer-to-peer application and by at least a part of the nodes of the peer-to-peer network, wherein the peer-to-peer application is a decentral register readable by all participants, wherein the peer-to-peer network comprises a plurality of nodes, and wherein the same peer-to-peer application is implemented on each node, wherein the peer-to-peer application comprises encryption means and/or signature means and/or verification means, wherein at least one means of the encryption means and/or signature means and/or verification means is configured to store at least a supply medium exchange release message, and wherein the peer-to-peer application comprises at least one reputation store and/or is configured to access at least one reputation store, wherein the reputation store comprises at least one of the peer-to-peer identification of at least one mobile unit and/or the peer-to-peer identification of at least one supply medium charging station together with a reputation factor, and wherein the peer-to-peer application is configured to update the at least one reputation factor based on a validation result.

13. A first peer-to-peer module assigned to a mobile unit in form of a vehicle, wherein the first peer-to-peer module is configured to:

communicate with a peer-to-peer application of a peer-to-peer network, and cause a generation of a supply medium exchange release message for releasing of the exchange of the supply medium between the mobile unit and a supply medium exchange station by means of the peer-to-peer application, such that the supply medium exchange release message is generated after a positive verification check of the first peer-to-peer module performed by means of the peer-to-peer application and by at least a part of the nodes of the peer-to-peer network, wherein the supply medium is electricity, gas, or fuel, wherein the peer-to-peer application is a decentral register readable by all-participants, wherein the peer-to-peer network comprises a plurality of nodes, and wherein the same peer-to-peer application is implemented on each node, wherein the peer-to-peer application comprises encryption means and/or signature means and/or verification means, wherein at least one means of the encryption means and/or signature means and/or verification means is configured to store at least a supply medium exchange release message, and wherein the peer-to-peer application comprises at least one reputation store and/or is configured to access at least one reputation store, wherein the reputation store comprises at least one of the peer-to-peer identification of at least one mobile unit and/or the peer-to-peer identification of at least one supply medium charging station together with a reputation factor, and wherein the peer-to-peer application is configured to update the at least one reputation factor based on a validation result.

14. A supply medium transmission connection in the form of a charging cable, comprising:

a first supply medium port corresponding to a supply medium exchange interface of a mobile unit in form of a vehicle, a further supply medium port corresponding to a supply medium exchange interface of a supply medium exchange station, wherein the first supply medium port and the further supply medium port are connected by a supply medium channel configured to transmit a supply medium in form of electricity, at least one first peer-to-peer module assigned to the mobile unit and configured to communicate with at least one peer-to-peer application of at least one peer-to-peer network, wherein the first peer-to-peer module is configured to cause a generation of a supply medium exchange release message for releasing of the exchange of the supply medium between the mobile unit and the supply medium exchange station by means of the peer-to-peer application, such that the supply medium exchange release message is generated after a positive verification check of the first peer-to-peer module performed by means of the peer-to-peer application and by at least a part of the nodes of the peer-to-peer network, wherein the peer-to-peer application is a decentral register readable by all participants, wherein the peer-to-peer network comprises a plurality of nodes, and wherein the same peer-to-peer application is implemented on each node, wherein the peer-to-peer application comprises encryption means and/or signature means and/or verification means, wherein at least one means of the encryption means and/or signature means and/or verification means is configured to store at least a supply medium exchange release message, and wherein the peer-to-peer application comprises at least one reputation store and/or is configured to access at least one reputation store, wherein the reputation store comprises at least one of the peer-to-peer identification of at least one mobile unit and/or the peer-to-peer identification of at least one supply medium charging station together with a reputation factor, and wherein the peer-to-peer application is configured to update the at least one reputation factor based on a validation result.

15. A method, comprising causing, by a first peer-to-peer module, a generation of a supply medium exchange release message for releasing of the exchange of the supply medium between a mobile unit and a supply medium exchange station by means of the peer-to-peer application, wherein the peer-to-peer application is configured to generate the supply medium exchange release message after a positive verification check of the first peer-to-peer module performed by means of the peer-to-peer application and by at least a part of the nodes of the peer-to-peer network, wherein the mobile unit is a vehicle, wherein the supply medium is electricity, gas, or fuel, wherein the peer-to-peer application is a decentral register readable by all participants, wherein the peer-to-peer network comprises a plurality of nodes, and wherein the same peer-to-peer application is implemented on each node, wherein the peer-to-peer application comprises encryption means and/or signature means and/or verification means, wherein at least one means of the encryption means and/or signature means and/or verification means is configured to store at least a supply medium exchange release message, and wherein the peer-to-peer application comprises at least one reputation store and/or is configured to access at least one reputation store, wherein the reputation store comprises at least one of the peer-to-peer identification of at least one mobile unit and/or the peer-to-peer identification of at least one supply medium charging station together with a reputation factor, and wherein the peer-to-peer application is configured to update the at least one reputation factor based on a validation result.

16. The supply medium exchange system of claim 1, wherein the supply medium storage is an electrical battery, a fuel cell, a gas tank, a biomass storage, or a fuel tank for liquid or solid fuel.

* * * * *